United States Patent [19]

Shackelford

[11] Patent Number: 5,202,981
[45] Date of Patent: Apr. 13, 1993

[54] PROCESS AND APPARATUS FOR MANIPULATING A BOUNDLESS DATA STREAM IN AN OBJECT ORIENTED PROGRAMMING SYSTEM

[75] Inventor: Floyd W. Shackelford, Buford, Ga.

[73] Assignee: International Business Machines Corporation, Armonk, N.Y.

[21] Appl. No.: 425,813

[22] Filed: Oct. 23, 1989

[51] Int. Cl.$^5$ .................... G06F 15/40; G06F 15/403
[52] U.S. Cl. ..................... 395/600; 395/425; 364/DIG. 1; 364/282.1; 364/283.1; 364/283.3; 364/245; 364/246
[58] Field of Search ............ 395/600, 425, 700, 62; 364/419

[56] References Cited

U.S. PATENT DOCUMENTS

| | | | |
|---|---|---|---|
| 4,791,550 | 12/1988 | Stevenson et al. | 395/650 |
| 4,821,220 | 4/1989 | Duisberg | 364/737 |
| 4,853,843 | 8/1989 | Ecklund | 395/600 |

OTHER PUBLICATIONS

Gray, S. N., "Notes on Database Operating Systems", In *Operating Systems: An Advanced Course*, ed. R. Bager et al., 1977, Chapter 3.f., 394–481.

*Primary Examiner*—Paul V. Kulik
*Attorney, Agent, or Firm*—Bell, Seltzer, Park & Gibson

[57] ABSTRACT

A process and apparatus for manipulating boundless data streams in an object oriented programming system provides a stream class of objects which includes as attributes an ordered list of object references to selected ones of the data objects stored in the data storage device. Methods for manipulating the object include move to first, move to last, move to next and move to previous which provide a bi-directional data stream. The data appears to the user as though it resides entirely in memory, even though it does not. The stream class implements a "sliding window" in an object oriented programming system which permits manipulation of any number of lists of virtually unlimited size when remaining within the physical limitations of finite storage.

50 Claims, 14 Drawing Sheets

CURRENT VALUE

CURRENT VALUE

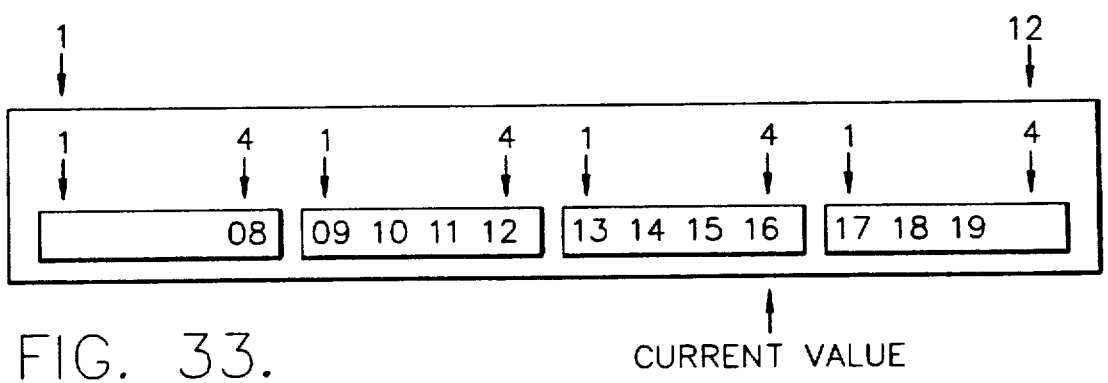
FIG. 33.   CURRENT VALUE
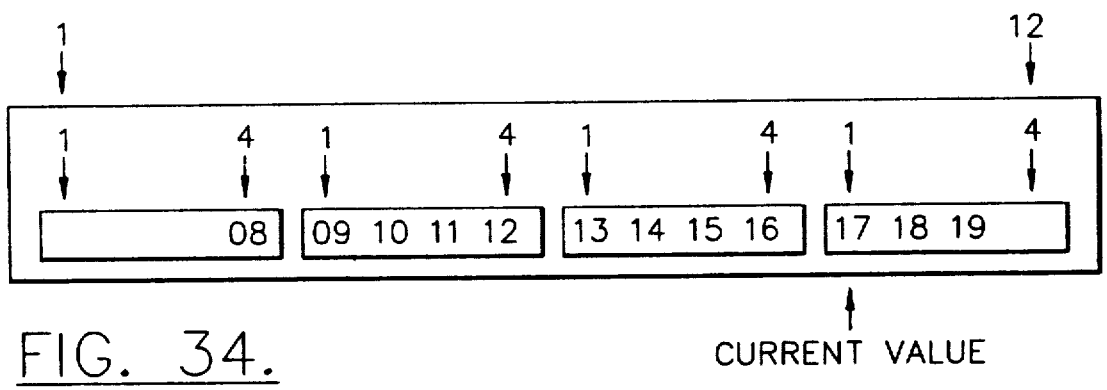
FIG. 34.   CURRENT VALUE

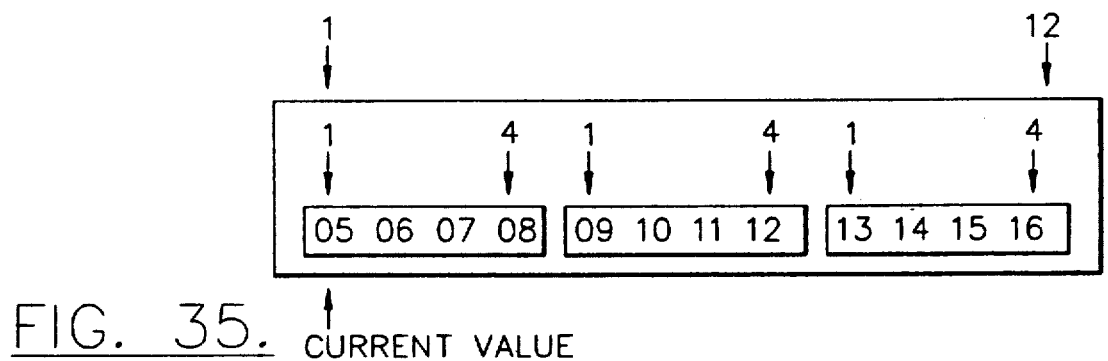
FIG. 35. CURRENT VALUE
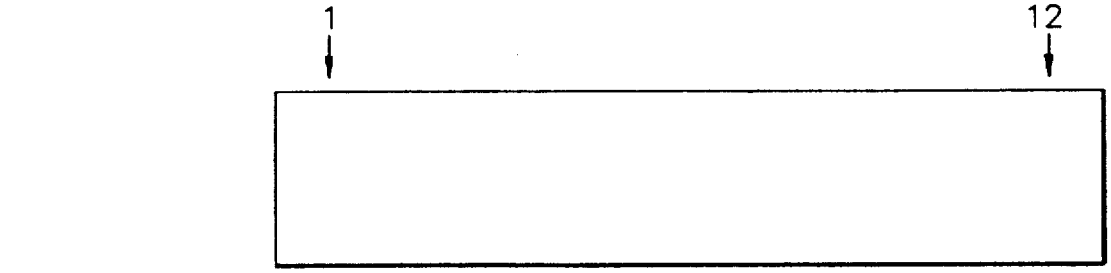
FIG. 36.
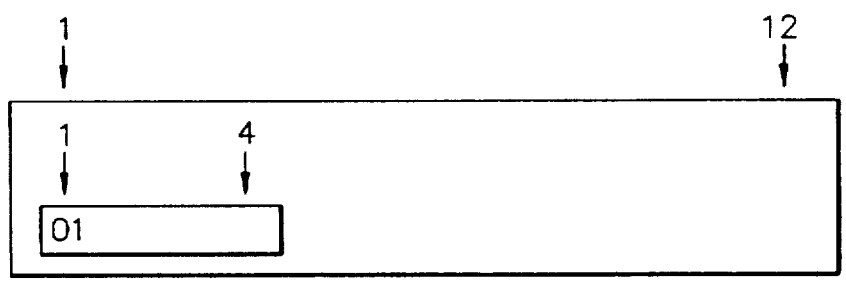
FIG. 37.
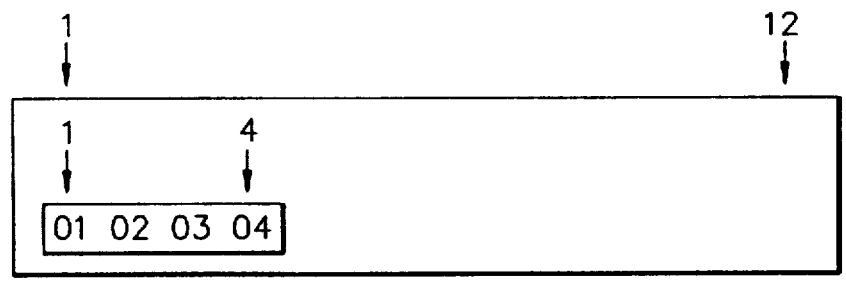
FIG. 38.

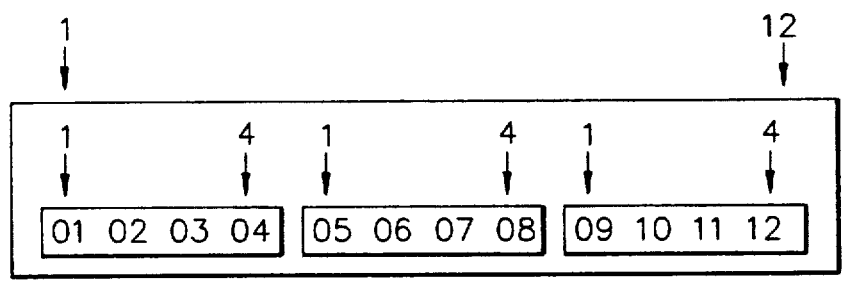
FIG. 39.
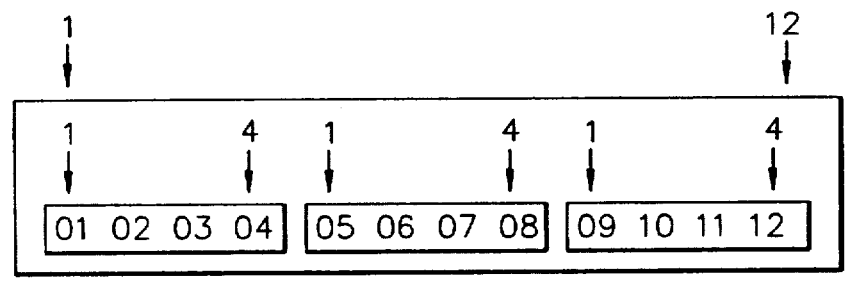
FIG. 40.    CURRENT VALUE

PROCESS AND APPARATUS FOR MANIPULATING A BOUNDLESS DATA STREAM IN AN OBJECT ORIENTED PROGRAMMING SYSTEM

FIELD OF THE INVENTION

This invention relates to object oriented programming systems and more particularly to a method and apparatus for manipulating a boundless data stream in an object oriented programming system.

BACKGROUND OF THE INVENTION

Object Oriented Programming systems and processes have been the subject of much investigation and interest in state of the art data processing environments. Object Oriented Programming is a computer program packaging technique which provides reusable and easily expandable programs. In contrast with known functional programming techniques which are not easily adaptable to new functional requirements and new types of data, object oriented programs are reusable and expandable as new requirements arise. With the ever increasing complexity of computer based systems, object oriented programming has received increased attention and investigation.

In an object oriented programming system, the primary focus is on data, rather than functions. Object oriented programming systems are composed of a large number of "objects" An object is a data structure and a set of operations or functions that can access that data structure. The data structure may be represented as a "frame". The frame has many "slots", each of which contains an "attribute" of the data in the slot. The attribute may be a primitive (i.e. an integer or string) or an Object Reference which is a pointer to the object's instance or instances (defined below). Each operation (function) that can access the data structure is called a "method".

FIG. 1 illustrates a schematic representation of an object in which a frame is encapsulated within its methods. FIG. 2 illustrates an example of an object, in which the data structure relates to employee data, and a number of methods surround this data structure. One method, for example, obtains the age of an employee. Each defined object will usually be manifested in a number of instances. Each instance contains the particular data structure for a particular example of the object. For example, an object for individual employee named Joyce Smith is an instance of the "employee" object.

Object oriented programming systems provide two primary characteristics which allow flexible and reusable programs to be developed. These characteristics are referred to as "encapsulation" and "inheritance". As may be seen from FIG. 1, the frame (data set) is encapsulated by its methods (functions). A wall of code has been placed around each piece of data. All access to the frame is handled by the surrounding methods. Data independence is thereby provided because an object's data structure is accessed only by its methods. Only the associated methods know the internal data structure. This ensures data integrity.

The "inheritance" property of object oriented programming systems allows previously written programs to be broadened by creating new superclasses and subclasses of objects. New objects are described by how they differ from preexisting objects so that entirely new programs need not be written to handle new types of data or functions.

FIG. 3 illustrates the inheritance property. For ease of illustration, the objects are illustrated as rectangles rather than as circles, with the object name at the top of a rectangle, the frame below the object name and the methods below the frame. Referring to FIG. 3, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnro, R. Nader and R. Reagan are persons. In other words, an instance is related to its class by an "is a" relation.

Each subclass "inherits" the frame and methods of its superclass. Thus, for example, a salesperson frame inherits age and hire date objects from the employee superclass as well as print and promote methods. Salesperson also includes a unique quota attribute and a pay commission method. Each instance can access all methods and frames of its superclass, so that, for example, B. G. Blue can be promoted.

In an object oriented system, a high level routine requests an object to perform one of its methods by sending the object a "message" telling the object what to do. The receiving object responds to the message by choosing the method that implements the message name, executing this method and then returning control to the calling high level routine, along with the results of the method.

Object oriented programming systems may be employed as database management systems which are capable of operating upon a large database, and which are expendable and adaptable. In an object oriented database management system, the data in the database is organized and encapsulated in terms of objects, with the instances of the objects being the data in the database. Similarly, the database manager may be organized as a set of objects with database management operations being performed by sending messages from one object to another. The target object performs the requested action on its attributes using its methods.

As described above, object oriented database management systems typically operate on large databases. However, it is difficult to manipulate the large database, or a large subset of the database which results from a database query, in order to view, update or delete selected elements therefrom. From a system perspective, the object oriented database, or the large query results, are a "boundless" data stream which is too large to fit in the system's memory, or into the portion of the system's memory allocated to an individual user.

As is well known to those having skill in the art, a data processor typically includes internal, volatile memory, often referred to as random access memory (RAM) or simply as "memory", which is available to the system for data manipulation. For multiuser systems, memory is typically divided among the users. Due to physical memory limitations, each user is limited to a maximum size of data stream which can be manipulated. In order to allow manipulation of data streams which exceed the maximum size, more memory must be provided, or a mechanism must be provided which creates the appearance of manipulating a boundless data stream without exceeding the physical limitations of the data processing environment.

Attempts have been made in prior art functionally programmed database management systems to provide the appearance of access to a boundless data stream by providing a "cursor" For example, in the Structured Query Language (SQL) database management system marketed by IBM Corporation as program product number 5470-XYR, a "cursor" is provided. The cursor is a file which provides forward pointers to a larger data stream. These forward pointers allow the data to be manipulated in the forward direction as one very large data stream. Operation of a cursor in an SQL database system is described in a publication entitled "IBM Database 2 Version 2 SQL Reference Release 1", IBM publication number SC26-4380-0, the disclosure of which is incorporated herein by reference.

Unfortunately an SQL cursor only allows a boundless data stream to be accessed or "scrolled" in the forward direction. Data manipulation often requires backward scrolling as well. In other words, bidirectional scrolling is required. Moreover, one particular SQL cursor may only be employed by one user at one time. Unfortunately, large database management systems often require multiuser capability. Finally, the SQL cursor is implemented in a functionally programmed database management system. A process and apparatus for bidirectional, multiuser manipulation of a boundless data stream in an object oriented database management system has heretofore not been available.

SUMMARY OF THE INVENTION

It is therefore an object of the invention to provide a process and apparatus for manipulating a boundless data stream.

It is another object of the invention to provide a process and apparatus for manipulating a boundless data stream in an object oriented programming system.

It is still another object of the invention to provide a process and apparatus for bidirectionally scrolling a boundless data stream in an object oriented programming system.

It is yet another object of the present invention to provide a process and apparatus for allowing a single user to bidirectionally scroll multiple instances of the same boundless data stream in an object oriented programming system.

These and other objects are provided by the present invention in an object oriented database management system including a data storage device having a database of data objects stored thereon and an object oriented database manager operating in a data processor connected to the data storage device. According to the invention, the object oriented database manager includes a "stream" class of objects. Each time a boundless data stream is manipulated by a user, an instance of the stream class is created.

The stream class of the present invention includes attributes and methods for allowing a boundless data stream to be manipulated bidirectionally by one user without exceeding the physical limitations of the user's environment. In particular, the stream class attributes include a number of pointers which identify sequential data objects selected from the database, and an attribute which identifies the maximum number of pointers permitted. The maximum number of pointers is limited by the amount of memory available to the user of the stream class instance. In effect, the attributes of the stream class create a "window" into the database for the user, with the maximum size of the window being determined by the amount of memory available to the user.

It will be understood by those having skill in the art that the pointer in the stream attributes may point directly to (i.e. directly identify) data objects in the database. Alternatively, the pointers may point to (identify) data objects in a large data stream produced as a result of a query to a database. In fact, the pointers may point to data elements in an SQL cursor. Each pointer in the stream class attribute may also indirectly point to the data elements in the database by pointing to a stream element which includes therein one or more data elements from the database. Alternatively, each pointer in the stream class attribute may point to a stream element which in turn contains a pointer to one or more data elements from the database. In other words, direct or indirect pointing may be employed.

According to the invention, an instance of the stream class is created when a user desires to manipulate a boundless data stream. The instance will contain space for a number of pointers, the maximum number of which is determined by the amount of available memory.

The data attributes of the stream class of the present invention also include an identification of a current one of the pointers, with the current pointer changing in response to a user request. Thus, each instance of the stream class will include a current value identification of one of the pointers in the set of pointers in the stream class instance.

The stream class of the present invention also includes methods associated therewith. In particular, "move to next" and "move to previous" methods are included. The "move to next" method changes the pointers in the stream class instance attributes to include the data element immediately following the current data element, and to include neighboring data elements of the immediately following data element in the remaining pointers, so that pointers to sequential data elements are included in the stream instance. When the maximum number of pointers are already present in the stream class instance, at least one pointer must be deleted before the immediately following data element may be inserted. Similarly, the "move to previous" method changes the pointers in the stream class instance attributes to include the data element immediately preceding the current data element, and to include neighboring elements of the immediately preceding data element in the remaining pointers, so that pointers to sequential data elements are included in the stream instance. When the maximum number of pointers are already present in the stream class instance, at least one pointer must be deleted before the immediately preceding data element may be inserted. The stream instance thereby provides a "sliding window" into the large data stream, with the sliding window including a desired data element, and as many surrounding data elements as are possible, consistent with the user's memory allocation.

The stream class of the present invention also includes methods to "move to first" and "move to last". In these methods, the pointers in the stream instance attributes are changed to include the first and last stream elements, respectively, and following or remaining elements respectively, up to the maximum allowed names of pointers. The stream class may also include an attribute defining the maximum number of data elements to be read each time the database is physically accessed, to thereby provide input/output buffering. In a preferred embodiment, the maximum number of pointers in the stream class instance attribute is preferably an integer multiple of the maximum number of data elements which can be read by the system at one time. The number of elements in the window is thereby a function of the number of elements which may be physically accessed at one time.

BRIEF DESCRIPTION OF THE DRAWINGS

FIGS. 30 through 34 illustrate a stream class of the present invention at various stages during operation of a third example of the present invention.

FIGS. 35 through 40 illustrate a stream class of the present invention at various stages during operation of a fourth example of the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

OBJECT ORIENTED COMPUTER SYSTEM

In an object oriented computer system, work is accomplished by sending action request messages to an object which contains (encapsulates) data. The object will perform the requested action on the data according to its predefined methods. The requestor of the action need not know what the actual data looks like or how the object manipulates it.

An object's class defines the types and meanings of the data and the action requests (messages) that the object will honor. The individual objects containing data are called instances of the class. Classes generally relate to real-world things. For example, "Parts" may be a class. The data elements (slots) of a part might be a part number, a status and a part type. The instances of this class represent individual parts, each with its own part number, status, and type information. The programs performing the requested actions are called methods of the class.

Object classes can be defined to be subclasses of other classes. Subclasses inherit all the data characteristics and methods of the parent class. They can add additional data and methods, and they can override (redefine) any data elements or methods of the parent class. While most messages are sent to object instances, the message that requests that a new instance be created is sent to an object class. The class will cause a new instance to be created and will return an object identifier by which that object will be known.

The sender of an action request message need not know the exact class of the object to which it is sending the message. As long as the target object either defines a method to handle the message or has a parent class that defines such a method, then the message will be handled using the data in the object instance and the method in its class or its parent class. In fact, it need not be an immediate parent, but may be a parent's parent, etc. The sender of the method need only have the object ID of the receiving object. This property of object oriented systems is called "inheritance". The inheritance property is used in the present invention.

Figure 1:
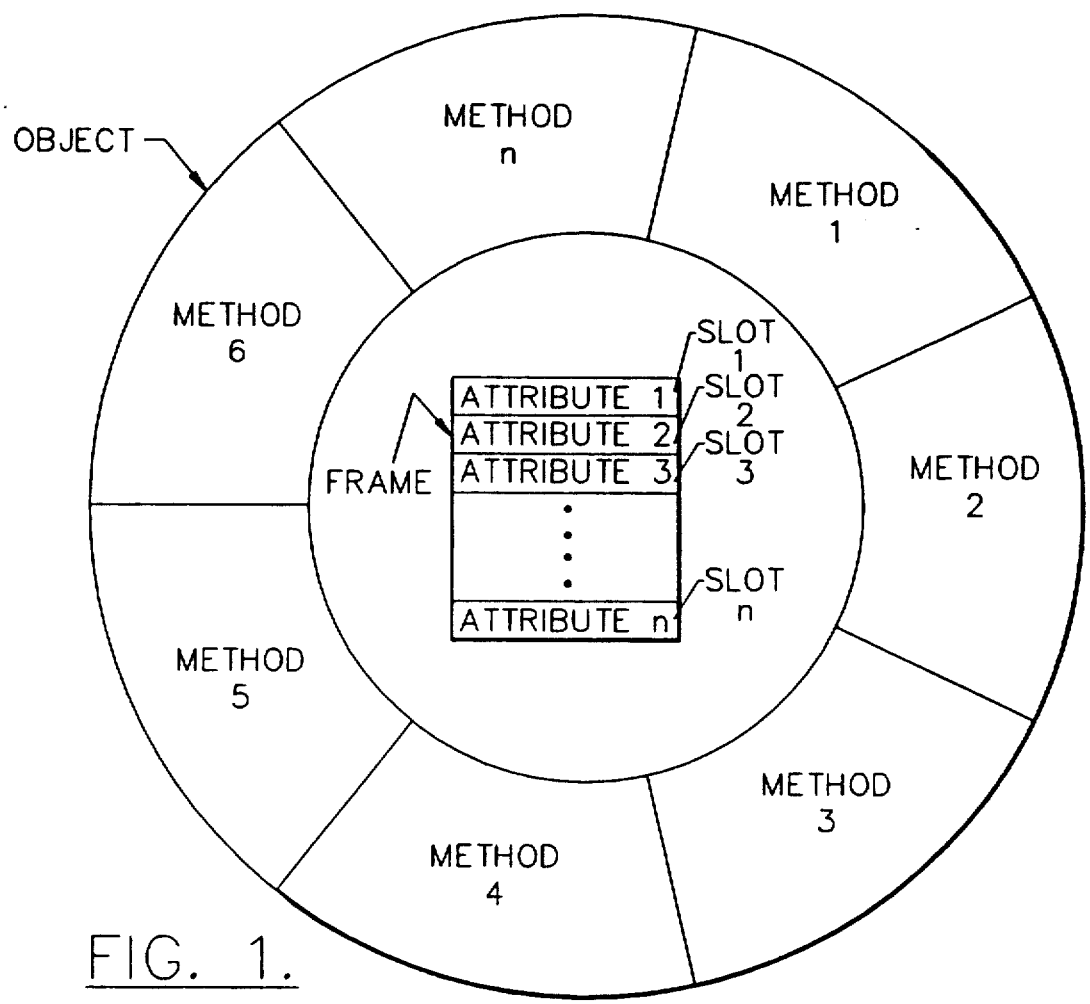
FIG. 1 illustrates a schematic representation of an object.
Figure 2:
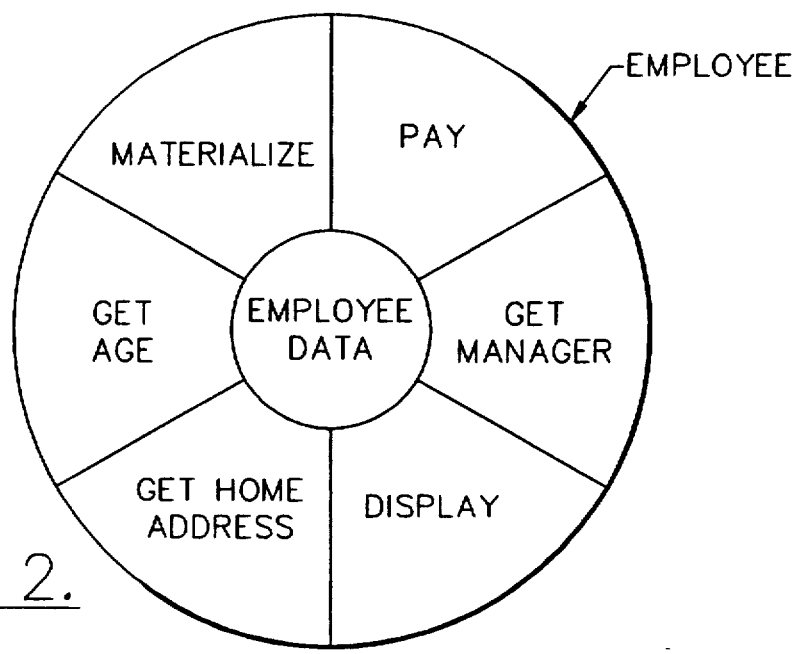
FIG. 2 illustrates a schematic representation of an example of an object.
Figure 3:
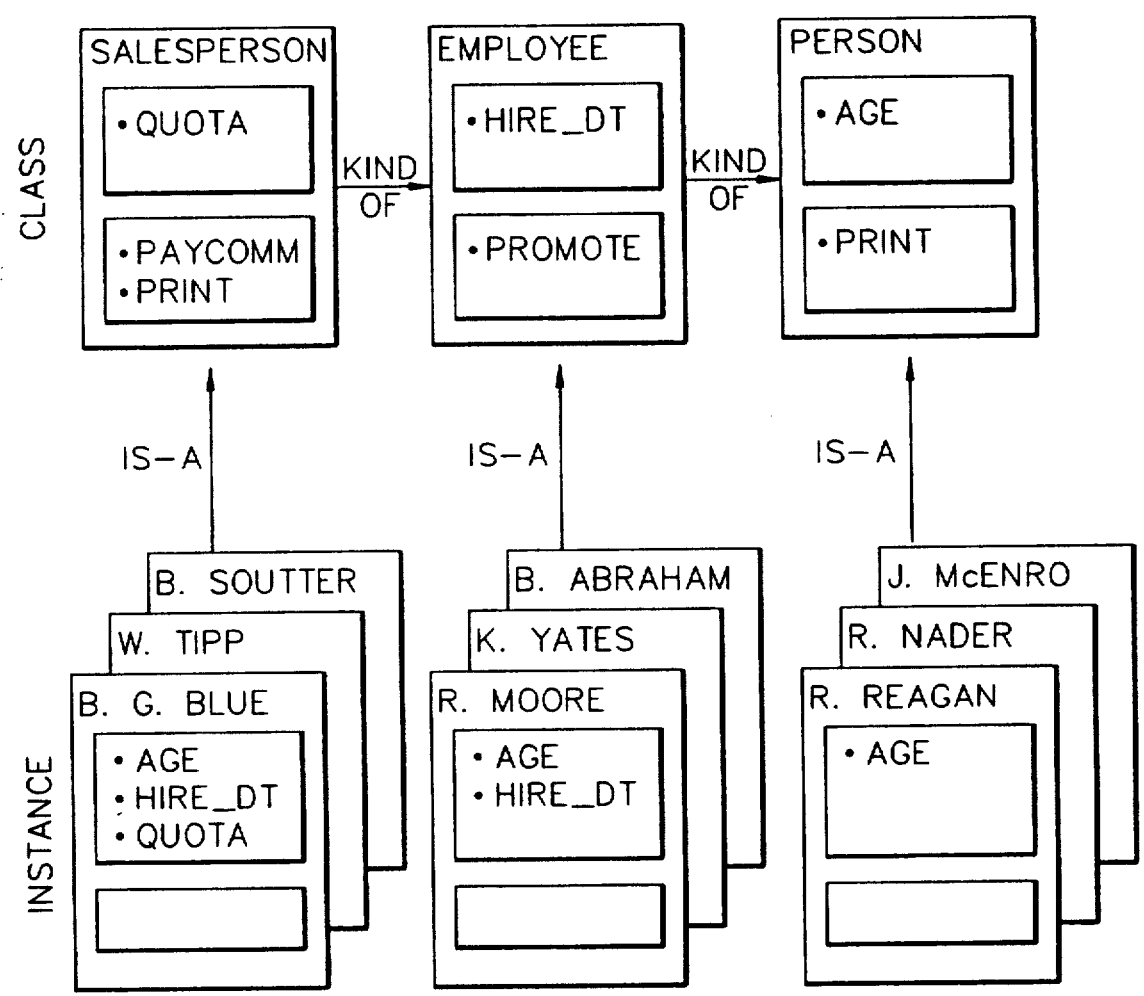
FIG. 3 illustrates the inheritance property of objects.
Figure 4:
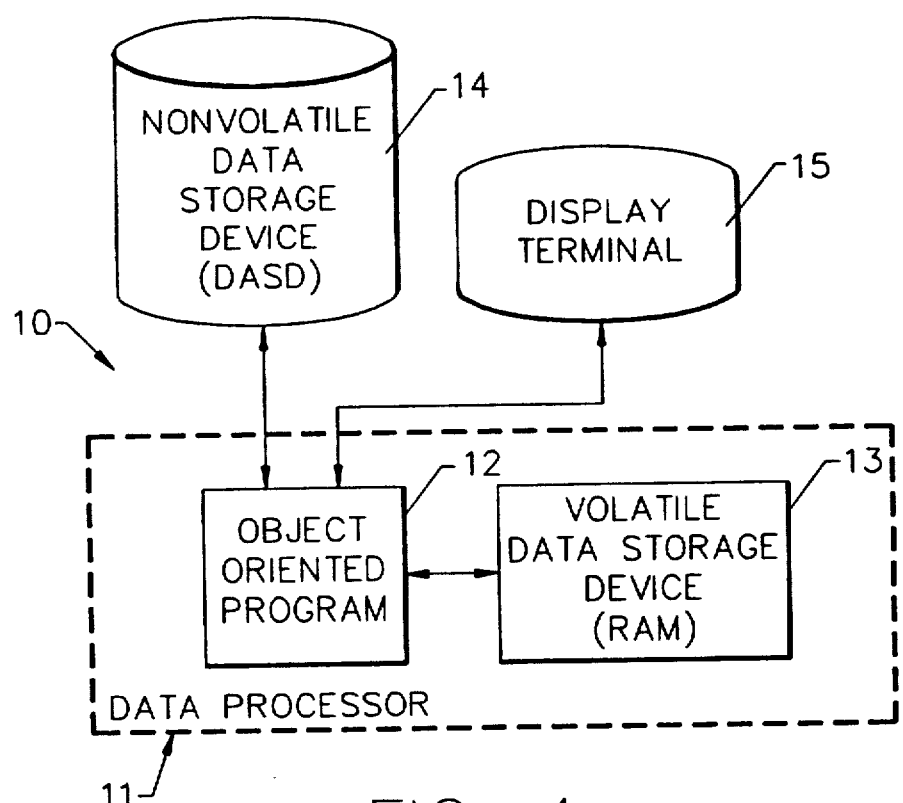
FIG. 4 illustrates a schematic block diagram of an object oriented computer system according to the present invention.

Referring now to FIG. 4, a schematic block diagram of an object oriented computer system 10 is illustrated. The system 10 includes a data processor 11 which may be a mainframe computer, minicomputer or personal computer. For large databases having multiple users, a mainframe computer is typically employed. As is well known to those having skill in the art, the data processor 10 includes a volatile data storage device 13, typically random access memory (RAM) for providing a working store for active data and intermediate results. Data in RAM 13 is erased when power to the data processor 11 is removed or a new user session is begun. System 10 also includes a nonvolatile data storage device 14 for permanent storage of objects. Device 14 may be a direct access storage device (DASD-a disk file) a tape file, an erasable optical disk or other well known device. Nonvolatile data storage device 14 will also be referred to herein as a "database". Volatile data storage device 13 will also be referred to as "memory". A display terminal 15 including a cathode ray tube (CRT) or other display, and a keyboard, is also shown.

An object oriented operating program 12 is also including in data processor 11. Object oriented operating program 12 may be programmed in object oriented languages such as "C" or "Smalltalk" or variations thereof, or in conventional programming languages such as FORTRAN or COBOL. The design of an object oriented operating program 12 is well known to those skilled in the art of object oriented programming systems, and will only be described generally below.

Figure 5:
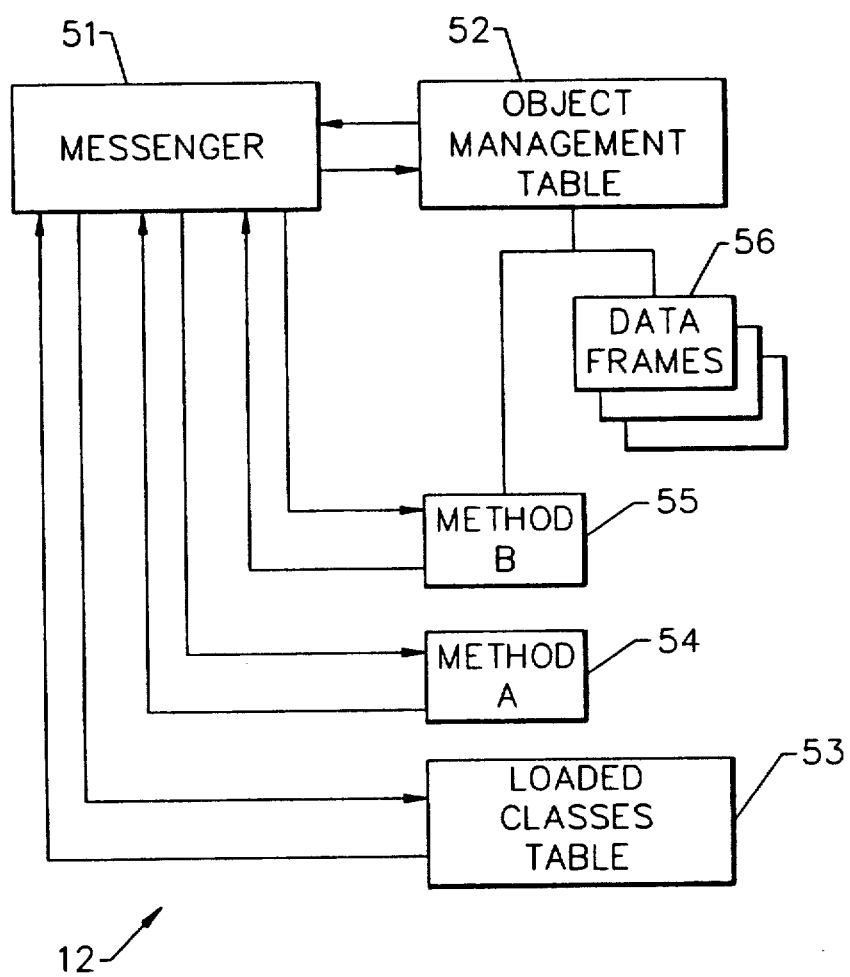
FIG. 5 illustrates a schematic block diagram of an object oriented program according to the present invention.

Referring now to FIG. 5, the main components of an object oriented program (12, FIG. 4) will be described. A more detailed description of the design and operation of an object oriented program is provided in "Object Oriented Software Construction", by Bertrand Meyer, published by Prentice Hall in 1988, the disclosure of which is incorporated herein by reference.

Referring to FIG. 5, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 5, in which Method A (block 54) of an object sends a message to Method B (block 55) of an object. Method A sends a message to Method B by calling Messenger 51. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 Which returns control to Method A.

BOUNDLESS DATA STREAM

Inherent within object oriented database management systems is the necessity to easily manipulate very large amounts of data. Due to the physical limitations of the computer and its operating system, each user is limited to a finite amount of storage. This, in turn, limits the amount of data which can be in memory at any one moment. In order to increase the volume of accessible data, either more memory must be allocated to the application or a mechanism is needed which provides the appearance of access to a very large volume of data while still remaining within the physical limitations of the user's environment. The present invention, a process and apparatus of manipulating boundless data streams, provides the user with the ability to manipulate any number of lists of virtually unlimited size in a finite amount of storage. This invention expands on the "cursor" known to those skilled in the art which permits only uni-directional access to data and which is non-recursive in that the data can only be used once by a single user at any single point in time, e.g. the SQL cursor.

The boundless data steam expands upon the capabilities of a "cursor" by providing more flexible navigation, i.e. bidirectional movement. Memory and I/0 optimization in the boundless data stream can be customized to meet the requirements of a particular application in various ways including altering the size of the stream as well as the amount of data read into memory from the cursor at one time. Furthermore, the data stream transparently manages multiple data streams against the same "cursor" Thus, the boundless data stream reduces the amount of computer application code necessary to manipulate a "cursor" while providing a superior interface to the data.

Figure 6:
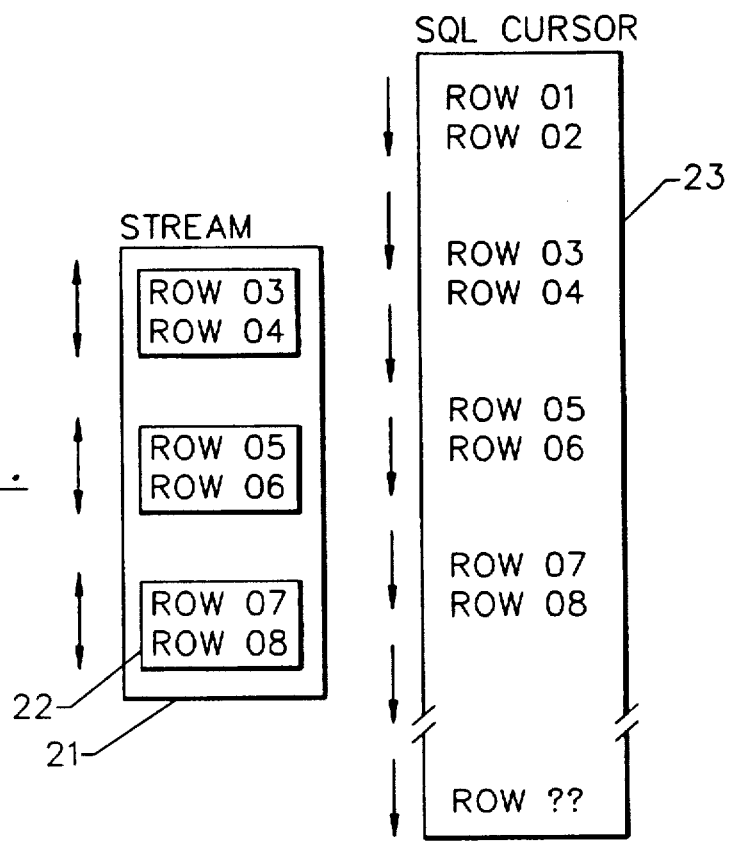
FIG. 6 illustrates a representation of the stream class of the present invention.
Figure 7:
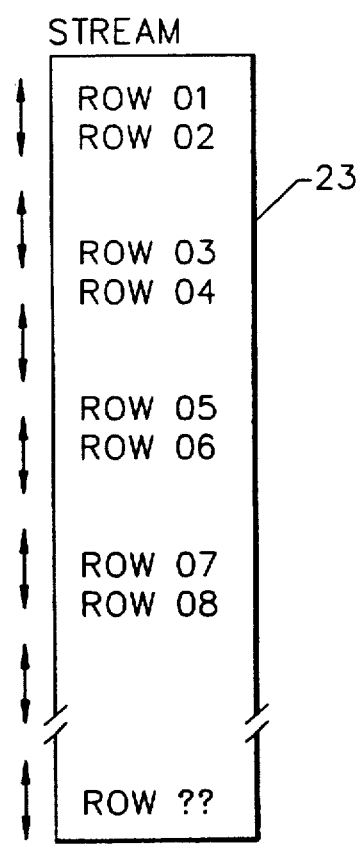
FIG. 7 illustrates a representation of the stream class of the present invention, as it appears to a user.

In an object oriented programming system, according to the present invention, the boundless data stream is an infinitely long linked list of object references. The physical structure of the data stream in memory may be represented as illustrated in FIG. 6. The large, outer stream box 21 is the maximum amount of memory utilized by the stream. The smaller, inner stream boxes 22 are the number of rows read from the cursor 23 at any one time. The arrows show the direction in which one may access the data. The stream, however, logically appears to the user as a bi-directional cursor. This is illustrated in FIG. 7 where the arrows show the direction in which one may access the data. The rows appear in groups of two because, in this example, the data will be read into the stream two elements at a time. This number is arbitrary and can be designated by the user in order to optimize I/O.

In an object oriented programming system, the boundless data stream may be implemented by two object classes, namely the Stream class and the Stream Element class. The Stream Element class is where the actual data is stored about the individual data objects for which the stream was developed. It could be something as simple as an object ID to a join of any number of objects. These appear in memory only while the Stream class needs them. They are discarded and recreated as memory requirements dictate.

The Stream class is composed of a linked list of object references to Stream Elements. Additionally, it has all those methods necessary for converting a "cursor" or any other similar uni-directional database access mechanism into a boundless linked list. This linked list allows both forward and backward movement and transparently handles all the cursor interfacing. Essentially, a user just moves up and down the Stream and accesses the data directly. The Stream handles all the cursor opens, closes, and positioning as well as all the memory management chores. Thus, for all practical purposes, the Stream appears to the user as a "smart" linked list. That is, all the data within the Stream appears automatically. The user need only reference it.

The Stream class allows a user to create any number of lists based upon the same cursor. The user can move to the first, last, next, or previous elements. In addition, the user can specify the maximum number of Stream Elements to maintain in memory at any one time. He also can specify the number of elements to be read with each physical access of the database, i.e. designate I/O buffer size. Finally, the user can refresh the list at any time with a single instruction so that the list contains the current, updated value of the data as stored in the database.

Some of the attributes and methods of the stream class and stream element class of the present invention will now be described in detail.

STREAM CLASS—ATTRIBUTES

Max_List_Size

Max_List_Size, an instance attribute (sometimes referred to as maximum attribute), permits the user to specify the maximum number of elements to keep in the linked list in RAM at any one time. Through its use, the overall memory requirements of a stream are reduced. For example, if the number of elements in the list is equal to Max_List_Size and an additional element is to be added to the end of the list, then a Delete_First is done by the Move_to_Next method. The default value for Max_List_Size is LONG_MAX. Where Max_List_Size is reduced to less than this default, it is desirable to set the new value to a multiple of the Number_to_Read instance attribute. It is preferable to use an integer multiple greater than 1 such as 10 or 100 times Number_to_Read.

Number_to_Read

Number_to_Read attribute (sometimes referred to as Number_to_Read number attribute) is the number of rows to be read from the cursor at any one time, i.e. the small box 22 in FIG. 6. This may also be called Buffer_Size. By reading a set number of rows at any given time, physical I/O performance is optimized.

Nb_Elements

The Nb_Elements instance attribute contains the total number of elements in the logical linked list. It has three states:

'zero'

Nb_Elements is set to "zero" when the stream has just been created but the database has not been accessed.

'Unknown_Nb_Elem' (999999999)

This is known as the "unknown" state since although elements have been read from the database, the actual end of the logical linked list has not been reached, i.e. the end of the cursor has not been reached.

'Known'

This state is the actual number of elements in the logical linked list. This state comes in to existence only when the end of the cursor has been reached, and only then can it be assigned to Nb_Elements.

An alternative embodiment adds an additional select statement which actually returns the count of the number of elements which will meet the selection criteria and assign that value at that time.

Current_Cursor

The Current_Cursor instance attribute is used to The Current indicate which cursor is the active cursor for the stream instance. Although it is possible to define any number of cursors within a particular stream class, any stream instance can only use one cursor within a particular stream class at a time.

Current_Value_Pointer

Current_Value_Pointer (sometimes referred to as current attribute) is the OREF to the Current Stream Element in the linked list.

Row_Count

Row_Count refers to the count of the rows in the database or in the result of the selection criteria.

STREAM CLASS—METHODS

Current_Value

The Current_Value instance method, returns the OREF to the current Stream Element in the linked list.

Move_to_First

The Move_to_First instance method positions the user at the first element in the logical linked list.

Move_to_Last

The Move_to_Last instance method positions the user at the last element in the logical linked list.

Move_to_Next

The Move_to_Next instance method positions the user at the next element in the logical linked list.

Move_to_Prev

The Move_to_Prev instance method positions the user at the previous element in the logical linked list.

Restart

The Restart instance method closes the physical database access link, i.e. the "cursor". It deletes all stream elements from memory and clears out the physical linked list. Finally, it resets the stream instance attributes to their original state. In other words, it forces the stream to refresh itself without having to delete it and create a new stream instance.

Reopen

The reopen method reopens a closed cursor and sets the pointer to the beginning of the cursor.

Other methods and attributes which are utilized to implement the above methods will be described in the examples which follow.

STREAM ELEMENT CLASS—ATTRIBUTES

Object_Id

The Object_Id instance attribute is an OREF to any object.

STREAM ELEMENT CLASS—METHODS

Create

This method creates a new Stream Element object.

Initialize

This method stores the values in the Stream Element object's instance attributes

DETAILED DESCRIPTION OF STREAM AND STREAM ELEMENT CLASS METHODS

Examples are now presented to illustrate the operation of the invention. Example 1 describes the move to first method which manipulates the data stream to set the current value pointer to point at the first element in the cursor. Example 2 describes the move to last method which manipulates the data stream to set the current value pointer to point at the last element in the cursor. Example 3 describes the move to next method which manipulates the data stream to set the current value pointer to point at the next element in the cursor. Example 4 describes the move to previous method which manipulates the data stream to set the current value pointer to point at the previous element in the cursor.

For purposes of these examples, arbitrary values are chosen for various attributes including Max—List—Size=12, Number—to—Read=4, and 19 rows in the database meet the selection criteria. In all examples, the term "database" is used to refer to nonvolatile data storage device 14 (FIG. 4). The terms "RAM" and "memory" are used to refer to a volatile data storage device 13 (FIG. 4).

The term "row" refers to an entry in a database table. It can represent either the physical row in the database table or the row as stored in memory. Thus, it is sometimes used interchangeably with the term Stream Element. "Stream Element" refers to an object instance which is pointed to by an object reference (OREF) within the physical list. OREF's are commonly used in object oriented programming systems to point to an instance of an object. Stream Elements are the memory images of rows retrieved from the database.

"Logical list", "logical linked list", or "virtual list" is the entire list as defined by the cursor's selection criteria against the physical database table(s). This is the list which "appears" to the user to be in memory but in reality is not. If instance attribute Max—List—Size, were set to infinity and all rows from the cursor could be placed into memory at one time, then the logical list would be the same as the physical list. "Physical list", "physical linked list", or "actual list" refer to the actual in-memory linked list used to track the Stream Elements. This is the "sliding window" of the database. Its size is the number of elements in this linked list is bounded by: $1 \leq$ number of elements in the physical list- $\leq$ Max—List—Size.

"Maximum list size" or "max-size" refer to the value defined by the Max—List—Size instance attribute. This is the maximum number of rows in memory at any one time. If the number of rows in the physical list exceeds this number, the first row in the physical list must be removed from memory before an additional row may be added at the end of the physical list. "Number to read", "read buffer", "burst mode read", or "burst read" refer to the value defined by the Number—to—Read instance attribute. A certain number of rows are read each time the stream must access the database with I/O commands. Since most database access mechanisms provide for some sort of data buffering, selection of the buffer size for this burst read optimizes the utilization of the database's buffering.

The reserved word SELF appears throughout the examples. As is well known to those having skill in the art, the use of SELF in an expression having a method and object denotes the current instance of the class. The function of SELF in the present invention denotes the current instance of the Stream Class.

Deferred methods also appear throughout the examples. As is well known to those having skill in the art, a deferred method which is defined by a class but is only implemented by the dependents (children) of the class. The function of the deferred method is precisely specified by the Stream Class of the present invention, although it is implemented by children of the Stream Class.

Figure 8:
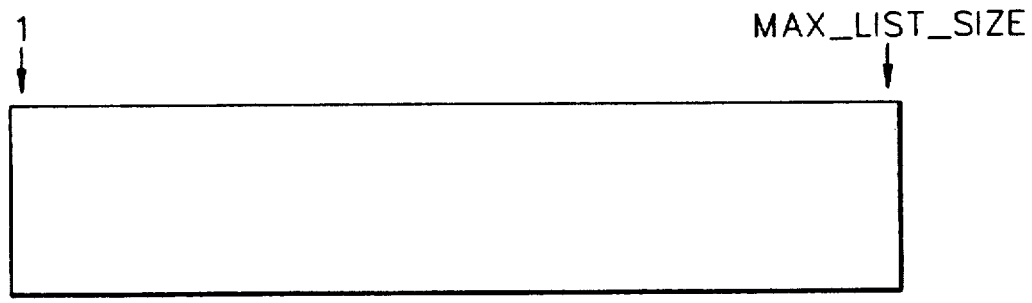
FIG. 8 illustrates a representation of the maximum size of a stream class of the present invention.
Figure 9:
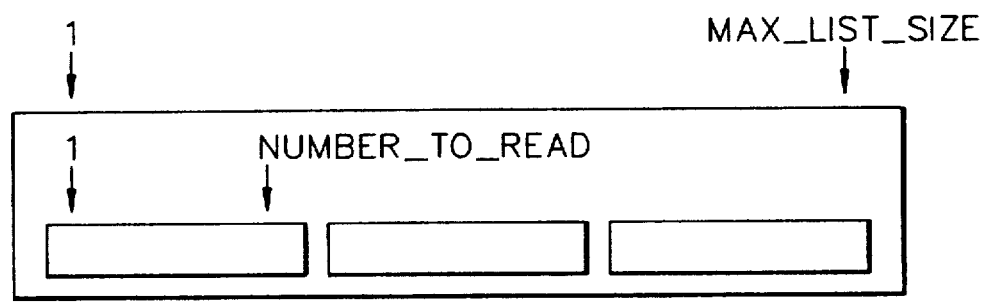
FIG. 9 illustrates input/output buffering in a stream class of the present invention.

Memory utilization at a particular time ("flash points") are also conceptually represented in the Examples. The data stream is illustrated as a vertical box as shown, for example in FIG. 6 and 7. The memory occupied by the physical list is illustrated as a long horizontal box as depicted in FIG. 8. It will hold at most Max—List—Size elements. The memory occupied by the elements read in any one burst mode from the database will be shown as a short horizontal box, usually within the physical list box, as illustrated in FIG. 9. Each burst mode box will hold a maximum of Number—to—Read elements.

Figure 10:
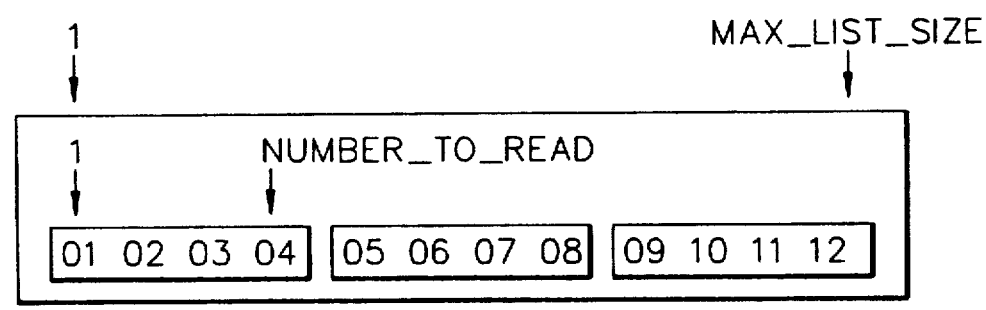
FIG. 10 illustrates stream elements in a stream class of the present invention.
Figure 11:
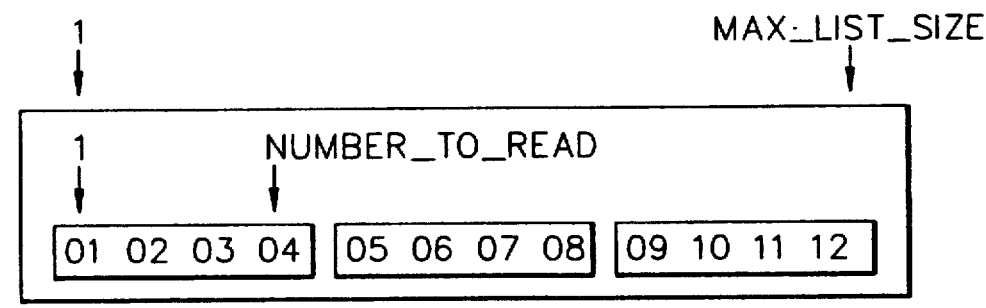
FIG. 11 illustrates a current value pointer in a stream class of the present invention.

As illustrated in FIG. 10, row numbers will often be seen within the burst read boxes to demonstrate which rows, i.e. stream elements, are in memory at that time. Finally, the current value pointer will be represented by a vertical arrowhead underneath the physical list. As illustrated in FIG. 11, it will point to the current element. In this figure, it is pointing to element 05.

EXAMPLE 1—MOVE TO FIRST

Figure 12:
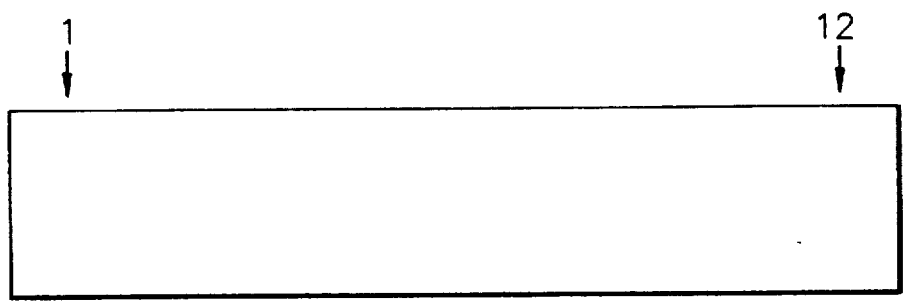
FIGS. 12 through 15 illustrate a stream class of the present invention at various stages during operation of a first example of the present invention.

As a first example, assume that there is a stream My—Stream which has already been created but has not yet been accessed. The physical list in memory is illustrated in FIG. 12. This example will load the first Number—to—Read elements which the buffer can hold. Once these are in the physical list, the current value pointer is set to point to the first element.

A user of My—Stream issues a call to the Move—to—First method, and the Move—to—First method receives control. This call can be represented as:

My—Stream.Move—to—First

The Move—to—First method determines that this is the first time the stream has been accessed. Thus, it makes a call to the stream's Load—Next method. Load—Next invokes the Fetch—Row method to retrieve a stream element. Fetch—Row now receives control. It determines that this is the first time this stream has been accessed and issues a call to the Open method. Open receives control and invokes the deferred method for the appropriate database query language to open the stream. This deferred method receives control.

The operation to this point can be illustrated on the program invocation stack as:

My—Stream.Move—to—First, which in turn called

SELF.Load—Next, which in turn called

SELF.Fetch—Row, which in turn called

SELF.Open, which in turn called

SELF.database—query—language—Open

The deferred method loads the relevant search criteria and opens the actual data cursor, i.e. cursor 23 in FIG. 6. It then returns a result code to its caller. Assuming that the open by the deferred method is successful, OK is returned to the caller, i.e. the Open method. Open determines that the open was successful and initializes instance attributes. Cursor Status is set to 'open' and Nb—Elements is set to Unknown—Nb—Elems. The Row—Count instance attribute is set to 0. Open then returns to its caller, i.e. Fetch_Row. Fetch_Row now issues a call to the database_query_language to Fetch, i.e. to get a stream element. Fetch receives control. The program invocation stack can be illustrated as:

My_Stream.Move_to_First, which in turn called

SELF.Load_Next, which in turn called

SELF.Fetch_Row, which in turn called

SELF.database_13 query_language_Open

The deferred Fetch routine fetches cursor row 01 into the appropriate host variables and issues a call to the Stream Element's Create method. The Stream Element's Create method creates an instance of the Stream Element and invokes the Initialize method. The program invocation stack can be illustrated as:

My_Stream.Move_to_First, which in turn called

SELF.Load_Next, which in turn called

SELF.Fetch_Row, which in turn called

SELF.datatbase_query_language_Fetch, which in turn called

Stream_Element.Create, which in turn called

Stream_Element.Initialize.

The Stream Element s Initialize method stores the values in its instance attributes and returns to the Create method. The Stream Element's Create method returns control to its caller, database_query_language_Fetch. Fetch returns the OREF of the newly created Stream Element to its caller, Fetch_Row. The Fetch_Row method increments the Row_Count instance attribute from 0 to 1 and returns control to its caller, Load_Next.

Figure 13:
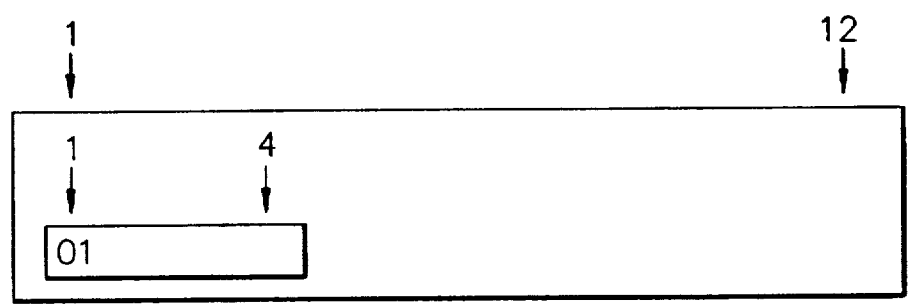
Figure 14:
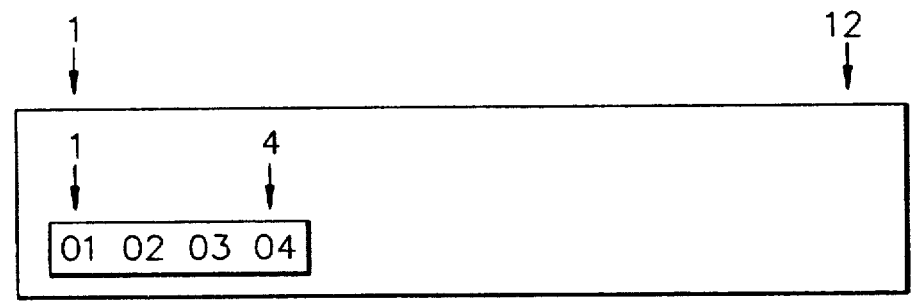

The Load_Next method adds the stream element to the end of the list which is currently empty. The physical list is illustrated in FIG. 13. The Load_Next method then invokes Fetch_Row and adds the resultant stream element to the physical list three more times, for a total of Number_to_Read times, in this example, 4 times. The physical list can be represented in FIG. 14.

Figure 15:
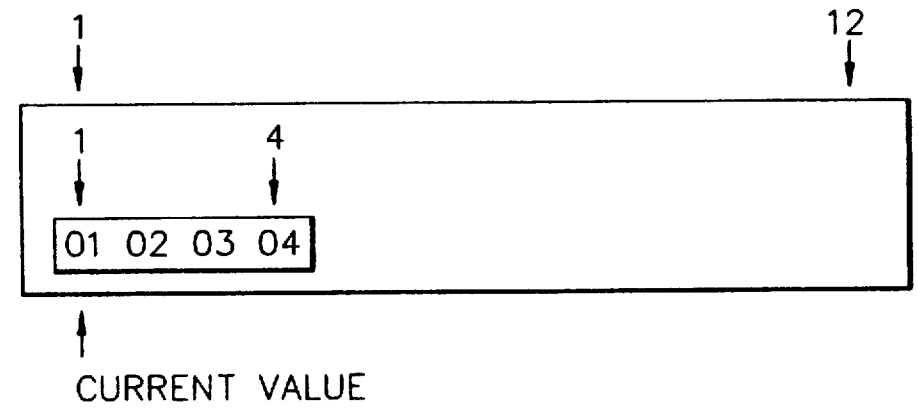

Load_Next has caused Number_to_Read, i.e. 4, rows to be read from the database. It now returns control to its caller, Move_to_First. At this point, the Current_Value_Pointer is undefined. Thus, the Move_to_First method now establishes the Current_Value_Pointer to point to the first element in the list. The physical list is illustrated in FIG. 15. Note that 4 elements were read in at one time in a single burst. These are illustrated in FIG. 15 in the burst read box (read buffer). The Current_Value_Pointer is pointing to the first element, stream element 01.

EXAMPLE 2—MOVE TO LAST

Figure 16:
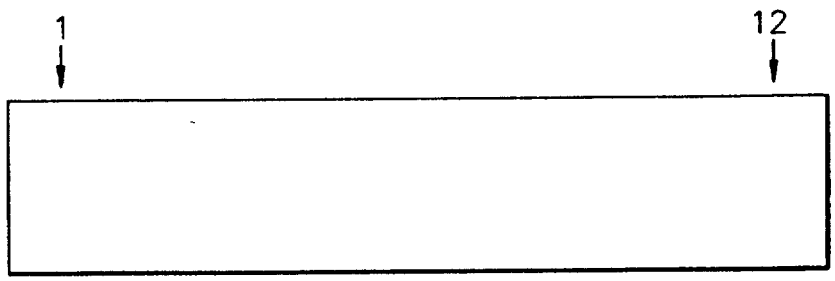
FIG. 16 through 29 illustrate a stream class of the present invention at various stages during operation o a second example of the present invention.

For the second example, again assume that there is a stream My_Stream which has already been created but has not yet been accessed. The physical list is illustrated in FIG. 16. This example reads in the elements a buffer at a time. Since the size of memory is 12 and buffer size is 4, three buffers will be read. Another buffer is read. Memory is then full. The first element in memory will be deleted end of memory. This will be repeated until the buffer is empty. Another buffer will be read from the database. Elements from the front of the physical list will be deleted and Elements from the buffer will be added to the end of the physical list. This process will continue until the end of the cursor is reached. The Current_Value_Pointer will then be set to point to the last element in the physical list.

A user of My_Stream issues a call to the Move_to_Last method and the Move_to_Last method receives control. The call can be represented as:

My_Stream.Move_to_Last

Move_to_Last determines that this is the first time the stream has been accessed. Thus, it calls the stream's Load_Next method. Load_Next invokes the Fetch_Row method to retrieve a stream element. Fetch_Row receives control. It determines that this is the first time this stream has been accessed and calls the Open method. Open receives control and invokes the deferred database_query_language_Open method. This deferred Open method receives control. The program invocation stack can be represented as:

My_Stream.Move_to_Last, which in turn called

SELF.Load_Next, which in turn called

SELF.Fetch_Row, which in turn called

SELF.Open, which in turn called

SELF.database_query_language_Open

Deferred Open loads the relevant search criteria and opens the actual data cursor, i.e. cursor 23 in FIG. 6. It then returns a result code to its caller, Open. Assuming that the open is successful, OK is returned to the caller, Open. Open determines that the open was successful and initializes the instance attributes. Cursor Status is set to 'open' and Nb_Elements is set to Unknown_Nb_Elems. The Row_Count instance attribute is set to 0. Open then returns control to its caller, Fetch_Row. Fetch_Row calls database_query_language_Fetch, to get a stream element. Fetch receives control. The program invocation stack can be represented as:

My_Stream.Move_to_Last, which in turn called

SELF.Load_Next, which in turn called

SELF.Fetch_Row, which in turn called

SELF.database_query_language_Fetch

Fetch fetches cursor row 01 into the appropriate host variables and issues a call to the Stream Element's Create method. The Stream Element's Create method creates an instance of the stream element and invokes the Initialize method. The program invocation stack can be represented as:

My_Stream.Move_to_Last, which in turn called

SELF.Load_Next, which in turn called

SELF.Fetch_Row, which in turn called

SELF.database—query—language—Fetch, which in turn called

Stream—Element.Create, which in turn called

Stream—Element.Initialize.

The Stream Element's Initialize method stores the values in its instance attributes and returns control to the Create method. The Stream Element's Create method returns control to its caller database—query—language—Fetch. Fetch returns the OREF of the newly created Stream Element to its caller, Fetch—Row. Fetch—Row increments the Row—Count instance attribute from 0 to 1 and returns control to its caller, Load—Next.

Figure 17:
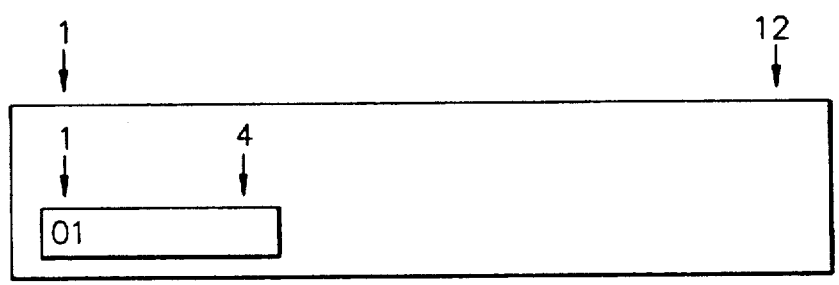
Figure 18:
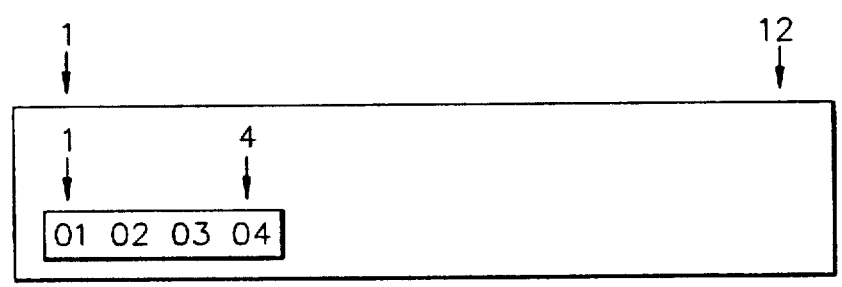

The Load—Next method adds Stream Element 01, i.e. Stream Element from Row 01 of the database selected results, to the end of the list which is currently empty. The physical list is illustrated in FIG. 17. Load—Next then invokes Fetch—Row and adds the resultant stream element to the physical list three more times, for a total of Number—to—Read times, i.e. 4 times. Thus, 4 elements are read in a single burst. The physical list can is illustrated in FIG. 18.

Load—Next has caused Number—to—Read rows, i.e. 4 rows, to be read from the database. It now returns control to its caller, Move—to—Last. Move—to—Last determines that the end of the cursor has not been reached. Thus, it calls the Load—Next method again, to load the next Number—to—Read block of rows. Load—Next invokes the Fetch—Row method to retrieve a stream element. Fetch—Row calls database—query—language—Fetch, to get a stream element. Fetch receives control. The program invocation stack can be represented as:

My—Stream.Move—to—Last, which in turn called

SELF.Load—Next, which in turn called

SELF.Fetch—Row, which in turn called

SELF.database—query—language—Fetch.

Fetch fetches cursor row 05 into the appropriate host variables and issues a call to the Stream Element's Create method. The Stream Element's Create method creates an instance of the Stream Element and invokes the Initialize method. The program invocation stack can now be represented as:

My—Stream.Move—to—Last, which in turn called
SELF.Load—Next, which in turn called SELF.Fetch—Row, which in turn called SELF.database—query—language—Fetch, which in turn called Stream—Element.Create, which in turn called Stream—Element.Initialize.

The Stream Element's Initialize method stores the values in its instance attributes and returns control to its caller, the Create method. The Stream Element's Create method returns control to its caller, database—query—language—Fetch. The Fetch routine returns the OREF of the newly created Stream Element to its caller, Fetch—Row.

Figure 19:
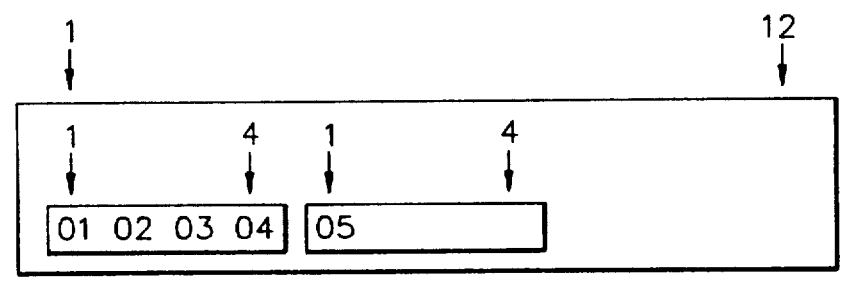
Figure 20:
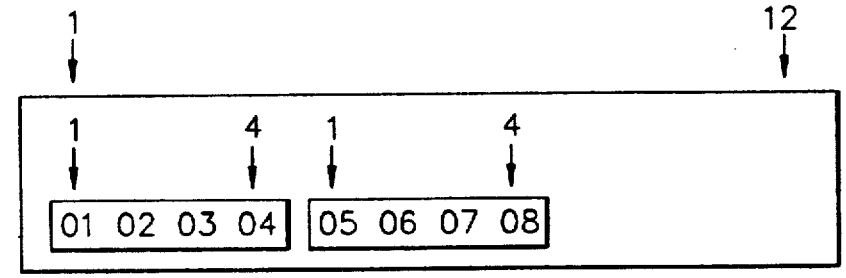

Fetch—Row increments the Row—Count instance attribute from 4 to 5 and returns control to its caller, Load—Next. Load—Next adds the 05 Stream Element, i.e. the element from row 5 of the cursor, to the end of the list. The physical list is illustrated in FIG. 19. Load—Next then invokes Fetch—Row and adds the resultant stream element to the physical list three more times, for a total of Number—to—Read times, i.e. 4 times. This is because 4 elements are read in a single burst. The physical list is illustrated in FIG. 20. Load—Next has caused Number—to—Read rows, i.e. 4 rows, to be read from the database. It now returns control to its caller, Move—to—Last.

Move—to—Last determines that the end of the cursor has not been reached. Thus, it calls the Load—Next method again, to load the next Number—to—Read block of rows, i.e. 4 rows. The Load—Next invokes the Fetch—Row method to retrieve a stream element. Fetch—Row issues a call to database—query—language—Fetch. Fetch receives control. The program invocation stack can be represented as:

My—Stream.Move—to—Last, which in turn called

SELF.Load—Next, which in turn called

SELF.Fetch—Row, which in turn called

SELF.database—query—language—Fetch.

Fetch fetches cursor row 09 into the appropriate host variables and issues a call to the Stream Element's Create method. The Stream Element's Create method creates an instance of the Stream Element and invokes the Initialize method. The program invocation stack can be represented as:

My—Stream.Move—to—Last, which in turn called

SELF.Load—Next, which in turn called

SELF.Fetch—Row, which in turn called

SELF.database—query—language—Fetch, which in turn called

Stream—Element.Create, which in turn called

Stream—Element.Initialize.

The Stream Element's Initialize method stores the values in its instance attributes and returns control to the Create method. The Stream Element's Create method returns control to its caller, database—query—language—Fetch. Fetch returns the OREF of the newly created Stream Element to its caller, Fetch—Row.

Figure 21:
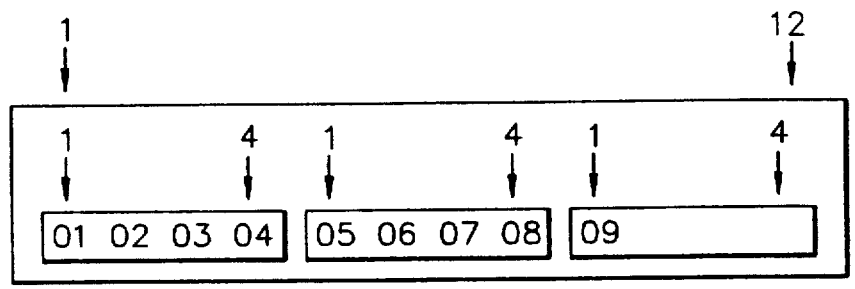

Fetch—Row increments the Row—Count instance attribute from 8 to 9 and returns control to its caller, Load—Next. Load—Next adds the 09 Stream Element to the end of the list. The physical list is illustrated in FIG. 21.

Load—next then invokes Fetch—Row and adds the resultant Stream Element to the physical list three more times, for a total of Number—to—Read times, i.e. 4 times. This is because 4 rows are read in a single burst.

Figure 22:
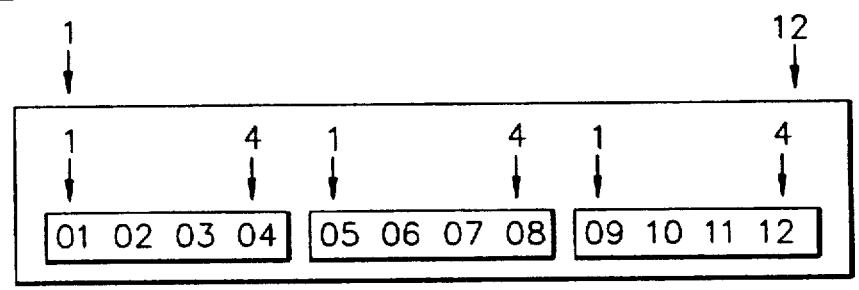

The physical list is illustrated in FIG. 22. Load_Next has caused Number_to_Read rows, i.e. 4 rows, to be read from the database. It now returns control to its caller, Move_to_Last.

Move_to_Last determines that the end of the cursor has not been reached, so it issues a call to the Load_Next method again, to load the next Number_to_Read block of rows, i.e. 4 rows. Load_Next invokes Fetch_Row to retrieve a stream element. Fetch_Row calls database_query_language_Fetch, to get a Stream Element. Fetch receives control. The program invocation can be represented as:

My_Stream.Move_to_Last, which in turn called

SELF.Load_Next, which in turn called

SELF.Fetch_Row, which in turn called

SELF.database_query_language_Fetch.

Fetch fetches cursor row 13 into the appropriate host variables and issues a call to the Stream Element's Create method. The Stream Element's Create method creates an instance of the Stream Element and invokes the Initialize method. The program invocation stack can be represented as:

My_Stream.Move_to_Last, which in turn called

SELF.Load_Next, which in turn called

SELF.Fetch_Row, which in turn called

SELF.database_query_language_Fetch, which in turn called

Stream_Element.Create, which in turn called

Stream_Element.Initialize.

The Stream Element's Initialized method stores the values in its instance attributes and returns control to the Create method. The Stream Element's Create method returns control to its caller, Fetch. The Fetch routine returns the OREF of the newly created Stream Element to its caller, Fetch_Row.

Figure 23:
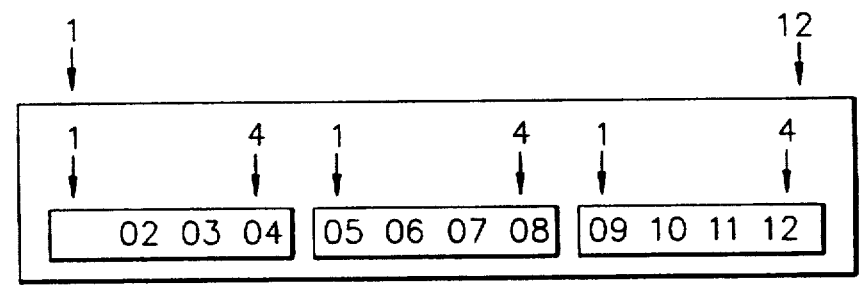
Figure 24:
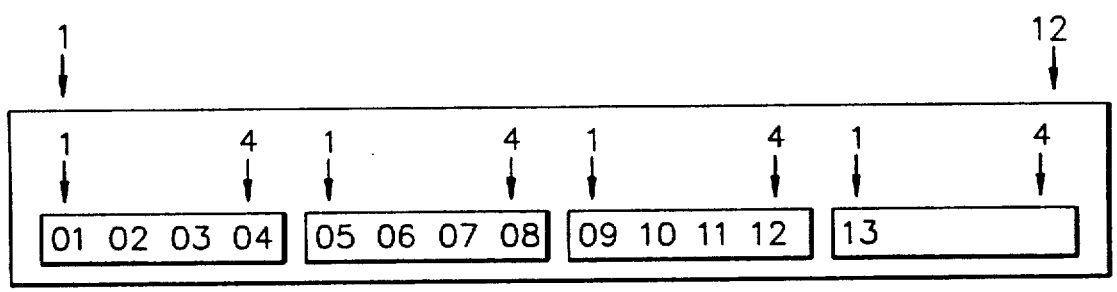

The Fetch_Row method increments the Row_Count instance attribute from 12 to 13 and returns control to its caller, Load Next. Load_Next determines that the physical list has reached the Max_List_Size boundary, so it deletes the first element off the list. The physical list is illustrated in FIG. 23. Load_Next next adds the stream element to the end of the list. The physical list is illustrated in FIG. 24. Notice that no more than a total of Max_List_Size, i.e. 12, elements are in the list at any one time.

Figure 25:
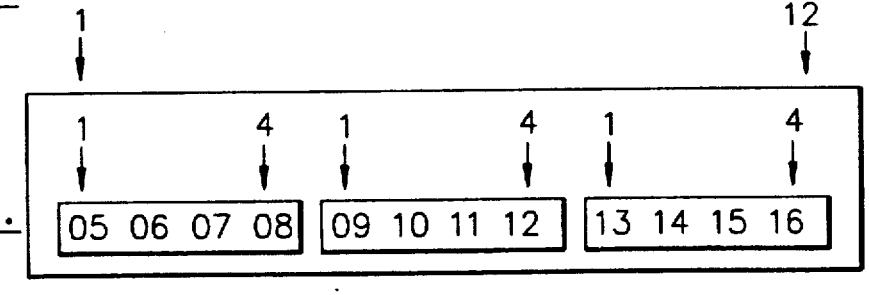

Load_Next invokes Fetch_Row and drops off the front elements and adds the resultant Stream Elements to the physical list three more times, for a total of Number_to_Read times. As is well known to those having skill in the art, elements are deleted from the front of a list by freeing the memory. The physical list is illustrated in FIG. 25. Load_Next has caused Number_to_Read rows, i.e. 4 rows, to be read from the database. It now returns control to its caller, Move_to_Last.

Move_to_Last determines that the end of the cursor still has not been reached. Thus, it calls the Load_Next method again, to load the next Number_to_Read block of rows, i.e. 4 rows. Load_Next invokes Fetch_Row to retrieve a Stream Element. Fetch_Row calls database_query_language_Fetch, to get a Stream Element. Fetch receives control. The program invocation stack can be represented as:

My_Stream.Move_to_Last, which in turn called

SELF.Load_Next, which in turn called

SELF.Fetch_Row, which in turn called

SELF.database_query_language_Fetch.

Fetch fetches cursor row 17 into the appropriate host variables and issues a call to the Stream Element's Create method. The Stream Element's Create method creates an instance of the Stream Element and invokes the Initialize method. The program invocation stack can be represented as:

My_Stream.Move_to_Last, which in turn called

SELF.Load_Next, which in turn called

SELF.Fetch_Row, which in turn called

SELF.database_query_language_Fetch, which in turn called

Stream_Element.Create, which in turn called

Stream_Element.Initialize.

The Stream Element's Initialize method stores the values in its instance attributes and returns control to the Create method. The Stream Element's Create method returns control to its caller, Fetch. Fetch returns the OREF of the newly created Stream Element to its caller, Fetch_Row.

Figure 26:
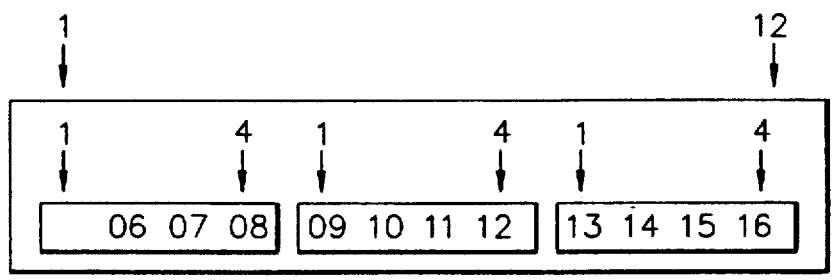
Figure 27:
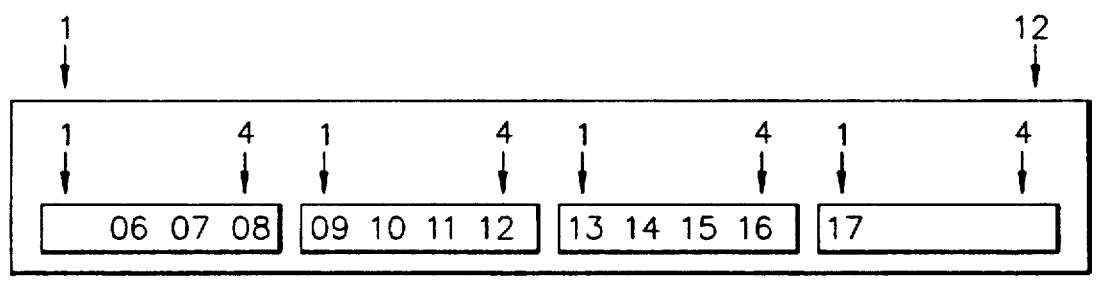
Figure 28:
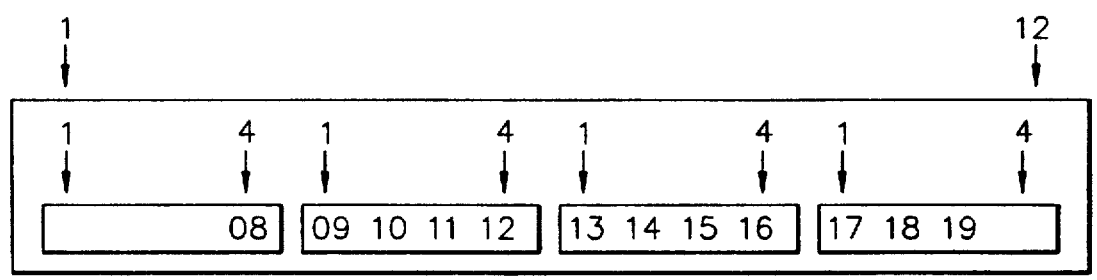

Fetch_Row increments the Row_Count instance attribute from 16 to 17 and returns to its caller, Load_Next. Load_Next determines that the physical list has reached the Max_List_Size boundary, i.e. 12, so it deletes the first element off the list. The physical list is illustrated in FIG. 26. Load_Next adds the stream element to the end of the list. The physical list is illustrated in FIG. 27. Notice that no more than a total of Max_List_Size, i.e. 12, elements are in the list at any one time. Load_next invokes Fetch_Row and drops off the front elements and adds the resultant Stream Element to the physical list two more times. The physical list is illustrated in FIG. 28.

The Load_Next method invokes the Fetch_Row method a fourth time. Load_Next invokes the Fetch_Row method to retrieve a Stream Element. Fetch_Row calls database_query_language_Fetch, to get a Stream Element. Fetch receives control. The program invocation stack can be represented as:

My_Stream.Move_to_Last, which in turn called

SELF.Load_Next, which in turn called

SELF.Fetch_Row, which in turn called

SELF.database_query_language_Fetch.

Figure 29:
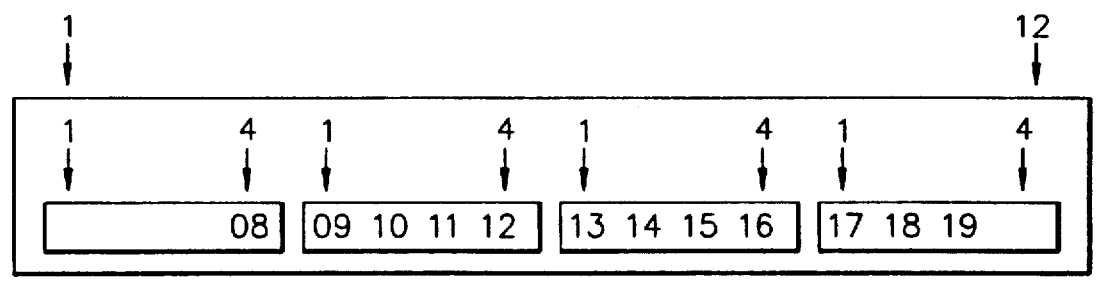

Fetch receives an End_of_Cursor from the fetch and returns control to Fetch_Row with the appropriate indicator. The Fetch_Row method sets Nb_Elements equal to Row_Count, sets the Cursor Status attribute to End_of_Cursor and returns control to its caller, Load_Next. The Load_Next method determines that the cursor has been closed from the value in Cursor Status and returns control to its caller, Move_to_Last, without modifying the physical list. The Move_to_Last method determines that the end of the cursor has now been reached. Since the Current_Value_Pointer is currently undefined, Move_to_Last establishes the Current_Value_Pointer to point to the last element in the list. The physical list is illustrated in FIG. 29. Note that there are only Max_Size_List elements, i.e. 12 elements, in the list. Also note that the Current_Value_Pointer is pointing to the last element, i.e. the element from row 19 in the result of the database selection.

EXAMPLE 3—MOVE TO NEXT

Figure 30:
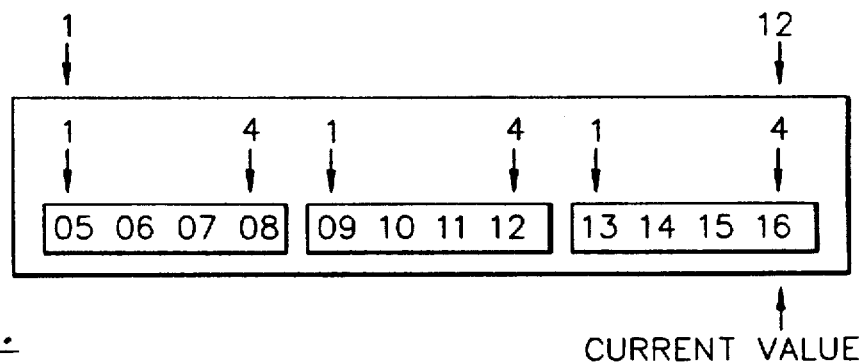

For purposes of this example, assume that a partial list is currently in memory. The physical list is illustrated in FIG. 30 shows where the maximum 12 elements (Max_List_Size) are in memory and the Current_Value_Pointer is pointing to the last element in the physical list, i.e. the element from the row 16 in the database. In this example, since the Current_Value_Pointer is pointing to the last element will be read from the cursor into the buffer. Elements will be deleted from the front of the physical list and added to the end of the physical list from the buffer, one at a time until the contents of the entire buffer is in the physical list. The Current_Value_Pointer will then be set to point to the next element in the physical list.

A user of My_Stream issues a call to the Move_to_Next method and the Move_to_Next method receives control. The call can be represented as:

My_Stream.Move_to_Next (End_of_List_Indicator)

End_of_List_Indicator is passed as a parameter and is assigned a state as control is returned. Move_to_Next determines that the Current_Value_Pointer is on the last element, i.e. the 12th element, in the physical list and also that the End_of_the_Cursor has not been reached. Thus, it invokes Load_Next to load in the next buffer, i.e. 4 elements, from a single burst. Load_Next invokes the Fetch_Row method to retrieve a Stream Element. Fetch_Row calls database_query_language_Fetch, to get a stream Element. Fetch receives control. The program invocation stack can be represented as:

My_Stream.Move_to_Next, which in turn called

SELF.Load_Next, which in turn called

SELF.Fetch_Row, which in turn called

SELF.database_query_language_Fetch.

Fetch fetches cursor row 17 into the appropriate host variables and issues a call to the Stream Element's Create method. The Stream Element's Create method creates an instance of the Stream Element and invokes the Initialize method. The program invocation stack can be represented as:

My_Stream.Move_to_Next, which in turn called

SELF.Load_Next, which in turn called

SELF.Fetch_Row, which in turn called

SELF.database_query_language_Fetch, which in turn called

Stream_Element.Create, which in turn called

Stream_Element.Initialize.

The Stream Element's Initialize method stores the values in its instance attributes and returns control to the control to its caller, Fetch. Fetch returns the OREF of the newly created Stream Element to its caller, Fetch_Row.

Figure 31:
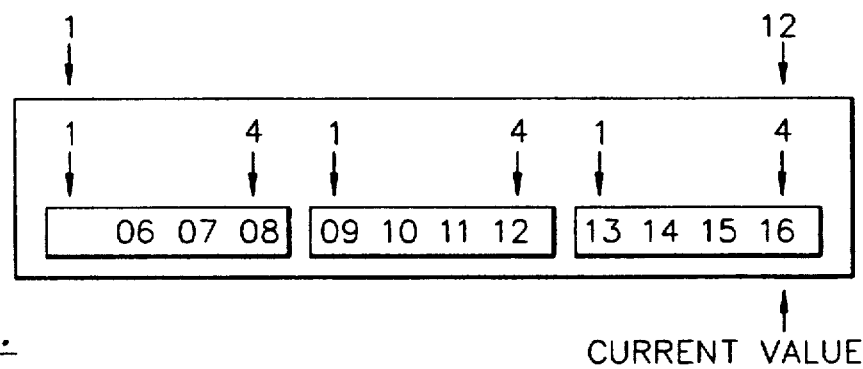

The Fetch_Row method increments the Row_Count instance attribute from 16 to 17 and returns control to its caller, Load_next. The Load_Next method determines that the physical list has reached the Max_List_Size boundary, i.e. 12 elements. Thus, it deletes the first element off the list. The physical list is illustrated in FIG. 31.

Figure 32:
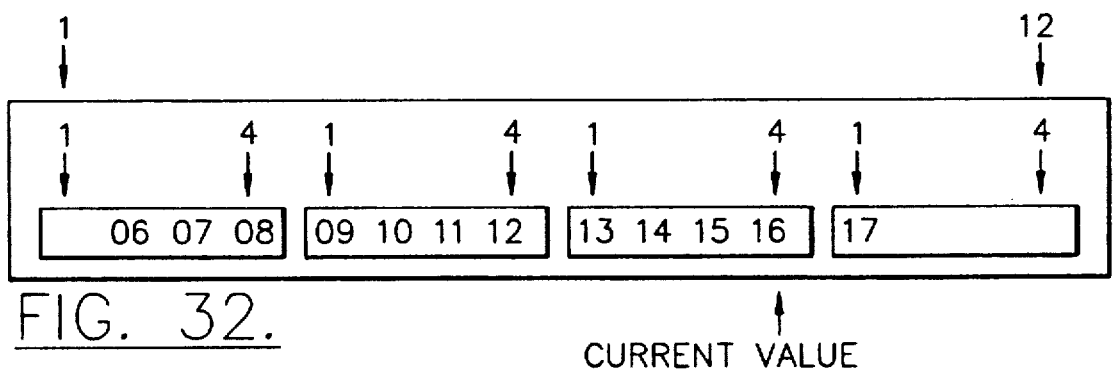

The Load_Next method adds the Stream Element to the end of the list. The physical list is illustrated in FIG. 32. Notice that no more than a total of Max_List_Size, i.e. 12, elements are in the list at any one time. The Load_Next method then invokes Fetch_Row and drops off the front elements and adds the resultant Stream Element to the physical list two more times. The physical list is illustrated in FIG. 33.

The Load_Next method invokes the Fetch_Row method a fourth time. The Load_Next invokes the Fetch_Row method to retrieve a Stream Element. Fetch_Row calls database_query_language_Fetch, to get a Stream Element. Fetch receives control. The program invocation stack can be represented as:

My_Stream.Move_to_Next, which in turn called

SELF.Load_Next, which in turn called

SELF.Fetch_Row, which in turn called

SELF.database_query_language_Fetch.

Fetch receives an End_of_Cursor from the fetch and returns control to Fetch_Row with the appropriate End_of_Cursor indicator. The Fetch_Row method sets the Cursor_Status attribute to End_of_Cursor and returns control to its caller, Load_Next. The Load_Next method determines that the cursor has been closed from the value in Cursor_Status and returns control to its caller, Move_to_Next, without modifying the physical list. The Move_to_Next method then moves the Current_Value_Pointer to the next element in the list, i.e. the element that was row 17 in the database. The physical list is illustrated in FIG. 34. Notice that there are Max_Size_List elements, i.e. 12 elements, in the physical list and the current value pointer is pointing to the element which was in row 17 in the database.

EXAMPLE 4—MOVE TO PREV

For purposes of this example, assume that a partial list is currently in memory with the Current_Value_Pointer pointing to the first element of the list. The physical list is illustrated in FIG. 35. In this example, it will be determined that Current_Value_Pointer is set to the first element of the physical list. The cursor pointer will be determined. All elements in the physical list will be deleted. The cursor will then be closed. The cursor will be reopened with the pointer pointing to the beginning of the cursor. Memory will be loaded with elements a Number_to_Read elements at a time. The Current_Value_Pointer will then be set to point to the previous element in memory (the physical list).

A user of My_Stream issues a call to the Move_to_Prev method and the Move_to_Prev method receives control. The call can be represented as:

My_Stream.Move_to_Prev (End_of_List_Indicator)

End_of_List_Indicator is passed as a parameter and is assigned its state as control is returned. The Move_to_Prev method determines that the Current_Value_Pointer is on the first element in the physical list and that some elements have previously been dropped from the beginning of the list. This is determined by comparing Row_Count to Max_List_Size. If it is greater, then some elements have been deleted from the beginning of the list. Thus, it invokes Load_Prev to load in the previous buffer. The Load_Prev method determines the physical row number of the element as it resided in the result of the database selection immediately preceding the first element in the physical list, i.e. row number 4. It then closes the cursor by calling the Close method.

Close calls the database_query_language_Close method. If there is more than one cursor open, database_query_language_Close determines which is open, closes it, and returns control to the Close method. Close returns control to its caller, Load_Prev. The Load_Prev method then deletes all the physical list elements and frees memory. The physical list is illustrated in FIG. 36.

The Load_Prev method then executes the Load_Next method for Max_List_Size/Number_to_Read times since Max_List_Size is 12 and Number_to_Read is 4, Load_Prev executes Load_Next 3 times. For the first of the 3 times, Load_Next receives control on the first loop and invokes the Fetch_Row method to retrieve a Stream Element. Fetch_Row calls database_query_language_Fetch, to get a Stream Element. Fetch receives control. The program invocation stack can be represented as:

My_Stream.Move_to_Prev, which in turn called

SELF.Load_Prev, which in turn called

SELF.Load_Next, which in turn called

SELF.Fetch_Row, which in turn called

SELF.database_query_language_Fetch.

Fetch finds that the cursor is closed and returns to its caller with an appropriate closed cursor indication. The Fetch_Row method, upon finding that the cursor is closed, calls the Reopen method to reopen and reposition the cursor. The Reopen method opens the cursor and positions the pointer to the beginning of the cursor. It then returns to the Fetch_Row method.

Fetch_Row now issues a call to itself to call database_query_language_Fetch, to get a Stream Element. Fetch receives control. The program invocation stack can be represented as:

My_Stream.Move_to_Prev, which in turn called

SELF.Load_Prev, which in turn called

SELF.Load_Next, which in turn called

SELF.Fetch_Row, which in turn called

SELF.Fetch_Row, which in turn called

SELF.database_query_language_Fetch.

Fetch fetches cursor row 01 into the appropriate host variables and issues a call to the Stream Element's Create method. The Stream Element's Create method creates an instance of the Stream Element and invokes the Initialize method. The program invocation stack can be represented as:

My_Stream.Move_to_Prev, which in turn called

SELF.Load_Prev, which in turn called

SELF.Load_Next, which in turn called

SELF.Fetch_Row, which in turn called

SELF.Fetch_Row, which in turn called

SELF.database_query_language_Fetch, which in turn called

Stream_Element.Create, which in turn called

Stream_Element.Initialize.

The Stream Element's Initialize routine stores the values in its instance attributes and returns to the Create method.

The Stream Element's Create method returns control to its caller, database_query_language_Fetch. Fetch returns the OREF of the newly created Stream Element to its caller, the second Fetch_Row. The second Fetch_Row method increments the Row_Count instance attribute from 0 to 1 and returns control to its caller, the first Fetch_Row. The first Fetch_Row returns control to Load_Next.

The Load_Next method adds the Stream Element to the end of the list, which is currently empty. The physical list is illustrated in FIG. 37. The Load_Next method then invokes Fetch_Row and adds the resultant Stream Element to the physical list three more times, for a total of Number_to_Read times. The physical list is illustrated in FIG. 38. Load_Next has caused Number_to_Read rows, i.e., 4 rows, to be read from the database since Number_To_Read is 4. It returns control to its caller, Load_Prev. Load_Prev invokes Load_Next two more times, for a total of three times. The physical list is illustrated in FIG. 39. Load_Next is called 3 times because Max_List_Size is 12 and Number_to_Read is 4.

Load_Prev now returns control to its caller, Move_to_Prev. The Move_to_Prev method positions the Current_Value_Pointer to the appropriate element in the list. The physical list is illustrated in FIG. 40. Notice that the Current_Value_Pointer is pointing to the element from the 4th row in the database, i.e. one before the row number from the database which the pointer pointed to in the physical list (row 5).

PSEUDO CODE APPENDIX A—STREAM CLASS

The following Appendix contains a pseudo code listing of an implementation of the stream class of the present invention in an object oriented computer system. The pseudo code listing is designed to operate with IBM's well-known Structured Query Language (SQL).

PSEUDO CODE APPENDIX B—STREAM ELEMENT CLASS

The following Appendix contains a pseudo code listing of an implementation of the stream class of the present invention in an object oriented computer system. The pseudo code listing is designed to operate with IBM's well-known Structured Query Language (SQL).

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. A method for bidirectionally accessing data in a database management system comprising a data storage device, a database of a first plurality of data elements stored in the data storage device, a data processor connected to the data storage device, said data processor executing a database manager for converting a plurality of unidirectional pointers into bidirectional pointers to manipulate said first plurality of data elements; said bidirectional access method comprising the steps of:
   accepting a query request;
   processing the accepted query request to obtain a second plurality of pointers to a second plurality of data elements selected from said first plurality of data elements as a result of said query;
   creating a file in said data storage device for storing said second plurality of pointers therein in a predetermined sequence, from a first to a last pointer, said file allowing only unidirectional access to said second plurality of pointers, from said first to said last pointers;
   accepting a request to manipulate said second plurality of data elements, including a selected one of said second plurality of data elements;
   creating a data window in said data storage device, for storing therein a third plurality of pointers selected from said second plurality of pointers stored in said file allowing only unidirectional access to said second plurality of pointers;
   storing the selected third plurality of pointers in said data window, the selected third plurality of pointers comprising a third plurality of sequential pointers from said second plurality of pointers stored in said file allowing only unidirectional access to said second plurality of pointers, including a pointer to said selected one of said second plurality of data elements; and
   bidirectionally accessing said third plurality of pointers stored in said data window and selected from said second plurality of pointers stored in said file allowing only unidirectional access to said second plurality of pointers.

2. The method of claim 1 wherein said query request accepting step comprises the step of accepting a request to manipulate a first data element in said file and wherein said storing step comprises the step of storing a third plurality of sequential pointers from said second plurality of pointers, beginning with said first pointer.

3. The method of claim 1 wherein said query request accepting step comprises the step of accepting a request to manipulate a last data element in said file and wherein said storing step comprises the step of storing a third plurality of sequential pointers from said second plurality of pointers, ending with said last pointer.

4. The method of claim 1 wherein said query request accepting step comprises the step of accepting a request to manipulate a next data element in said file and wherein said storing step comprises the step of storing a third plurality of sequential pointers from said second plurality of pointers, including a pointer to said next data element.

5. The method of claim 1 wherein said query request accepting step comprises the step of accepting a request to manipulate a previous data element in said file and wherein said storing step comprises the step of storing a third plurality of sequential pointers from said second plurality of pointers, including said next data element.

6. The method of claim 3 wherein said storing step further comprises the step of repeatedly storing the third plurality of sequential pointers beginning with said first pointer, until said last pointer is stored.

7. A database management system comprising:
   a data storage device;
   a database of a first plurality of data elements stored in said data storage device;
   a data processor connected to said data storage device; and
   said data processing executing a database manager, for converting a plurality of unidirectional pointers into bidirectional pointers to manipulate said first plurality of data elements, comprising:
   means for accepting a query request;
   means for processing the accepted query request to obtain a second plurality of pointers to a second plurality of data elements selected from said first plurality of data elements as a result of said query;
   means for creating a file in said data storage device for storing said second plurality of pointers therein in a predetermined sequence, from a first to a last pointer, said file allowing only unidirectional access to said second plurality of pointers, from said first to said last pointers;
   means for accepting a request to manipulate said second plurality of data elements, including a selected one of said second plurality of data elements;
   means for creating a data window in said data storage device, for storing therein a third plurality of pointers selected from said second plurality of pointers stored in said file allowing only unidirectional access to said second plurality of pointers;

means for storing the selected third plurality of pointers in the data window, the selected third plurality of pointers comprising a third plurality of sequential pointers from said second plurality of pointers stored in said file allowing only unidirectional access to said second plurality of pointers, including the pointer to said selected one of said plurality of said elements; and means for bidirectionally accessing said third plurality of pointers stored in said data window and selected from said second plurality of pointers stored in said file allowing only unidirectional access to said second plurality of pointers.

8. The system of claim 7 wherein said query request accepting means comprises means for accepting a request to manipulate a first data element in said file and wherein said means for storing comprises means for storing a third plurality of sequential pointers from said second plurality of pointers, beginning with said first pointer.

9. The system of claim 7 wherein said query request accepting means comprises means for accepting a request to manipulate a last data element in said file and wherein said means for storing comprises means for storing a third plurality of sequential pointers from said second plurality of pointers, beginning with said last pointer.

10. The system of claim 7 wherein said query request accepting means comprises means for accepting a request to manipulate a next data element in said file and wherein said means for storing comprises means for storing a continuous third plurality of sequential pointers from said second plurality of pointers, including a pointer to said next data element.

11. The system of claim 7 wherein said query request accepting means comprises means for accepting a request to manipulate a previous data element in said file and wherein said means for storing comprises means for storing a third plurality of sequential pointers from said second plurality of pointers, including a pointer to said previous data element.

12. The system of claim 9 wherein said means for storing further comprises means for storing a series of third pluralities of sequential pointers beginning with said first pointer, until said last pointer is stored.

13. The system of claim 7 wherein said file comprises a structured query language cursor.

14. A process for manipulating a data stream comprising a second plurality of data objects in an object oriented database management system comprising a data storage device, a database of a first plurality of data objects stored in said data storage device in a predetermined sequence, a data processor connected to said data storage device, said data processor executing an object oriented database manager, for manipulating said first plurality of data objects; said process comprising the steps of:

providing a stream class of objects in said object oriented database manager, said stream class of objects including stream class attributes and stream class methods;

said stream class attributes comprising:

a second plurality of pointers for identifying a second plurality of data objects selected from said first plurality of data objects in said database;

a current attribute for identifying a current one of said second plurality of pointers; and a maximum attribute for identifying the maximum number of pointers in said second plurality of pointers;

said stream class methods comprising:

a first method for placing in an instance of said stream class, a second plurality of pointers including a pointer for identifying a data object immediately preceding the data object identified in said current attribute; and a second method for placing in an instance of said stream class, a second plurality of pointers including a pointer for identifying a data object immediately succeeding the data object identified in said current attribute;

creating an instance of a stream class object to manipulate said first plurality of data objects using said second plurality of pointers; and processing said instance of said stream class object on said data processor using said first and second stream class methods.

15. The process of claim 14 wherein said stream class methods further comprise:

a third method for placing in an instance of said stream class, a second plurality of pointers including a pointer for identifying a first data object in the predetermined sequence of said first plurality of data objects; and a fourth method for placing in an instance of said stream class, a second plurality of pointers including a pointer for identifying a last data object in the predetermined sequence of said first plurality of data objects; and wherein said processing step further comprises processing said instance of said stream class object on said data processor using said third and fourth stream class methods.

16. The process of claim 14 wherein said second plurality of pointers directly identify said second plurality of data objects.

17. The process of claim 14 wherein said second plurality of pointers comprise said second plurality of data objects.

18. The process of claim 14 further comprising the step of creating a stream element class of objects, and creating a second plurality of instances of said stream element class of objects, a respective one of said second plurality of pointers identifying a respective one of said second plurality of instances of said stream element class.

19. The process of claim 18 wherein said second plurality of instances of said stream element class of objects includes a pointer for identifying a respective one of said second plurality of data objects.

20. The process of claim 18 wherein said second plurality of instances of said stream element class of objects comprises a respective one of said second plurality of data objects.

21. The process of claim 14 further comprising the step of selecting said maximum attribute to be less than or equal to the maximum number of pointers which may be stored in said data storage device.

22. The process of claim 14 wherein said first method performs the following steps:

deleting at least one of said second plurality of pointers from said stream class attributes; and inserting said pointer for identifying a data object immediately preceding the data object identified in said current attribute, into said stream class attributes.

23. The process of claim 14 wherein said second method performs the following steps:

deleting at least one said second plurality of pointers from said stream class attributes; and inserting said pointer for identifying a data object immediately succeeding the data object identified in said current attribute, into said stream class attributes.

24. The process of claim 15 wherein said third method performs the following steps:

deleting all of said second plurality of pointers from said stream class attributes; and inserting said pointer for identifying said first data object into said second plurality of pointers.

25. The process of claim 15 wherein said third method performs the following steps:

deleting all of said second plurality of pointers from said stream class attributes; and inserting a second plurality of pointers for identifying said stream class, with the inserted second plurality of pointers beginning with said first data object.

26. The process of claim 15 wherein said fourth method performs the following steps:

deleting all of said second plurality of pointers from said stream class attributes; and inserting a second plurality of pointers for identifying said stream class, with the inserted second plurality of pointers ending with said last data object.

27. The process of claim 14 wherein said step of creating an instance comprises the step of creating an instance of said stream class object for each user of said object oriented database management system.

28. The process of claim 14 wherein said step of creating an instance comprises the step of creating an instance of said stream class object for each query of said database in said object oriented database management system.

29. An object oriented database management system comprising:

a data storage device;

a database of a first plurality of data objects stored in said data storage device in a predetermined sequence;

a data processor connected to said data storage device;

said data processing executing an object oriented database manager, for manipulating said first plurality of data objects, said object oriented database manager including a stream class of objects, said stream class of objects including stream class attributes and stream class methods;

said stream class attributes comprising:

a second plurality of pointers for identifying a second plurality of data objects selected from said first plurality of data objects in said database;

a current attribute for identifying a current one of said second plurality of pointers; and a maximum attribute for identifying the maximum number of pointers in said second plurality of pointers;

said stream class methods comprising:

a first method for placing in an instance of said stream class, a second plurality of pointers including a pointer for identifying a data object immediately preceding the data object identified in said current attribute; and a second method for placing in an instance of said stream class, a second plurality of pointers including a pointer for identifying a data object immediately succeeding the data object identified in said current attribute;

creating means, including in said object oriented database manager, for creating an instance of a stream class object; and stream class method processing means, included in said object oriented database manager, for processing said instance of said stream class object using said first and second stream class methods.

30. The object oriented database management system of claim 29 wherein said stream class methods further comprise:

a third method for placing in an instance of said stream class, a second plurality of pointers including a pointer for identifying a first data object in the predetermined sequence of said first plurality of data objects; and a fourth method for placing in an instance of said stream class, a second plurality of pointers including a pointer for identifying a last data object in the predetermined sequence of said first plurality of data objects; and wherein said stream class method processing means also processes said instance of said stream class object using said third and fourth stream class methods.

31. The object oriented database management system of claim 29 wherein said database of data objects comprises a subset of a larger database of data objects, said first plurality of data objects resulting from a query of said larger database.

32. The object oriented database management system of claim 29 wherein said data storage device comprises a nonvolatile data storage device and wherein said database is stored in said nonvolatile data storage device.

33. The object oriented database management system of claim 29 wherein said data storage device comprises a volatile data storage device and wherein said database is stored in said volatile data storage device.

34. The object oriented database management system of claim 31 wherein said subset of a larger database comprises a cursor of said larger database.

35. The object oriented database management system of claim 29 wherein said second plurality of pointers directly identify said second plurality of data objects.

36. The object oriented database management system of claim 29 wherein said second plurality of pointers comprise said second plurality of data objects.

37. The object oriented database management system of claim 29 wherein said object oriented database manager further includes a stream element class of objects, and means for creating a second plurality of instances of said stream element class of objects, a respective one of said second plurality of pointers identifying a respective one of said second plurality of instances of said stream element class.

38. The object oriented database management system of claim 37 wherein said second plurality of instances of said stream element class of objects includes a pointer for identifying a respective one of said second plurality of data objects.

39. The object oriented database management system of claim 37 wherein said second plurality of instances of said stream element class of objects comprises a respective one of said second plurality of data objects.

40. The object oriented database management system of claim 29 wherein said maximum attribute is selected to be less than or equal to the maximum number of pointers which may be stored in said data storage device.

41. The object oriented database management system of claim 29 wherein said first method comprises:
means for deleting at least one of said second plurality of pointers from said stream class attributes; and
means for inserting said pointer for identifying a data object immediately preceding the data object identified in said current attribute, into said stream class attributes.

42. The object oriented database management system of claim 29 wherein said second method comprises:
means for deleting at least one of said second plurality of pointers from said stream class attributes; and
means for inserting said pointer for identifying a data object immediately succeeding the data object identified in said current attribute, into said stream class attributes.

43. The object oriented database management system of claim 30 wherein said third method comprises:
means for deleting all of said second plurality of pointers from said stream class attributes; and
means for inserting said pointer for identifying said first data object into said second plurality of pointers.

44. The object oriented database management system of claim 30 wherein said third method comprises:
means for deleting all of said second plurality of pointers from said stream class attributes; and
means for inserting a second plurality of pointers for identifying said stream class, with the inserted second plurality of pointers beginning with said first data object.

45. The object oriented database management claim 30 wherein said fourth method comprises:
means for deleting all of said second plurality of pointers from said stream class attributes; and
means for inserting a second plurality of pointers for identifying said stream class, with the inserted second plurality of pointers ending with said last data object.

46. The object oriented database management system of claim 29 wherein said second plurality of data objects comprises a second plurality of sequential data objects selected from said first plurality of data objects.

47. The object oriented database management system of claim 29 wherein said stream class attributes further comprise:
a number attribute for identifying the number of said first plurality of objects to be read from said data storage device at one time.

48. The object oriented database management system of claim 47 wherein said maximum attribute is an integer multiple of said number attribute.

49. The object oriented database management system of claim 29 wherein said means for creating an instance comprises means for creating an instance of said stream class object for each user of said object oriented database management system.

50. The object oriented database management system of claim 29 wherein said means for creating an instance comprises means for creating an instance of said stream class object for each query of said database in said object oriented database management system.

* * * * *

UNITED STATES PATENT AND TRADEMARK OFFICE
CERTIFICATE OF CORRECTION

PATENT NO.  : 5,202,981
DATED       : April 13, 1993
INVENTOR(S) : Shackelford

Page 1 of 22

It is certified that error appears in the above-identified patent and that said Letters Patent is hereby corrected as shown below:

```
Column 1, line 31, after "objects" insert --.--.

Column 3, line 7, after " "cursor" " insert --.--.

Column 5, line 40, "FIG." should be --FIGS.--.

Column 5, line 41, "o" should be --of--.

Column 6, lines 57-58, "including" should be
--included--.

Column 7, line 39, "Which" should be --which--.

Column 8, line 5, after " "cursor" " insert --.--.

Column 9, line 25, delete "Number_to_Read".

Column 9, line 63, delete "The".

Column 9, line 64, delete "Current".

Column 10, line 1, "Current_Value_Pointer" (first
occurrence) should be centered above column.

Column 10, line 60, after "attributes" insert --.--.

Column 11, line 39, after "is" (first occurrence),
insert --limited by the Max_List_Size instance attribute.
That is,--.
```

UNITED STATES PATENT AND TRADEMARK OFFICE
CERTIFICATE OF CORRECTION

PATENT NO. : 5,202,981

DATED : April 13, 1993

INVENTOR(S) : Shackelford

It is certified that error appears in the above-identified patent and that said Letters Patent is hereby corrected as shown below:

Column 12, line 66, "Cursor Status" should be --Cursor_Status--.

Column 13, line 12, "delete "$_{13}$" and insert --_--.

Column 13, line 33, "Element s" should be --Element's--.

Column 13, line 68, after "deleted" insert --and the next element from the buffer will be loaded at the--.

Column 14, line 40 "Cursor Status" should be --Cursor_Status--.

Column 17, line 43, "Initialized" should be --Initialize--.

Column 19, line 6 "Cursor Status" should be --Cursor_Status--.

Column 19, line 10, "Cursor Status" should be --Cursor_Status--.

Column 19, line 26, delete "shows".

Column 19, line 31, after "element" insert --in the physical list, the next Number_to_Read elements--.

Column 19, line 64, "$_{Fetch}$" should be --Fetch--.

UNITED STATES PATENT AND TRADEMARK OFFICE
CERTIFICATE OF CORRECTION

PATENT NO. :  5,202,981
DATED       :  April 13, 1993
INVENTOR(S) :  Shackelford It is certified that error appears in the above-identified patent and that said Letters Patent is hereby corrected as shown below:

Column 20, line 21, after "the" (first occurrence) insert --Create method. The Stream Element's Create method returns--.

Column 22, line 1, "$_{\text{Fetch}}$" should be --Fetch--.

Column 22, line 25, "$_{\text{Fetch}}$" should be --Fetch--.

Column 23, line 2, "i.e.." should be --i.e.--.

Column 23, line 23, after "(SQL)." insert --APPENDIX A - STREAM CLASS-- attached).

Column 23, line 32, after "(SQL)." insert --APPENDIX B - STREAM ELEMENT CLASS- attached).

Column 24, line 48, "processing" should be --processor--.

Column 25, line 13, "said" (second occurrence) should be --data--.

Column 25, line 31, "beginning" should be --ending--.

UNITED STATES PATENT AND TRADEMARK OFFICE
CERTIFICATE OF CORRECTION

PATENT NO. : 5,202,981
DATED : April 13, 1993
INVENTOR(S) : Shackelford

It is certified that error appears in the above-identified patent and that said Letters Patent is hereby corrected as shown below:

Column 27, line 53, "processing" should be --processor--.

Column 28, line 11, "including" should be --included--.

Column 29, lines 25-26 should be indented.

Column 30, line 8, after "management" insert --system of--.

Signed and Sealed this

First Day of November, 1994

*Attest:*

BRUCE LEHMAN

*Attesting Officer*     *Commissioner of Patents and Trademarks*

APPENDIX A - STREAM CLASS

```
package body Stream_Cls is -- deferred          --* UADBSTRE

--* A stream object is a "smart" linked list of stream elements which
--* loads its data automatically from a SQL cursor. This stream class
--* is not totally effective since it lacks the actual SQL cursor declarations.
--*
--* To make your own stream:
--*
--* 1. Group all your queries by application by stream element. This
--*    means that, in general, place all your queries within a
--*    particular application which share the same stream element into
--*    a single stream class.
--*
--* 2. Inherit from this class and define the deferred methods
--*    identified throughout this document: SQL_Open, SQL_Close, and
--*    SQL_Fetch. Take care that their relative positions are not
--*    changed. In particular, SQL_Open must physically appear in the
--*    class representation before both
--*    SQL_Close and SQL_Fetch. Why? The SQL pre-processor is a one
--*    pass processor and the cursor declaration must appear before
--*    any references to it. Since the cursor declaration is at the
--*    beginning of the SQL_Open method, it must, by default, appear
--*    before the other SQL_??? methods.
--*
--* 3. Define assignment methods to load the search criteria instance
--*    attributes. There are a couple of ways to do this. You can
--*    define one single instance method which accepts all the search
--*    criteria for a particular cursor as parameters. This single
--*    method would load the appropriate instance attributes and also
--*    set the Current_Cursor to refer to the correct cursor.
--*
--*    Alternatively, you could have multiple, single valued
--*    assignment statements. This stream object could then be passed
--*    around to different methods where each may fill in a portion of
--*    the selection criteria. When all relevant selection criteria
--*    has been supplied, another method on this stream would then be
--*    called which assigned the correct cursor number to
--*    Current_Cursor. You may want one method which assigns a value
--*    to Current_Cursor for each query, or you may want one method
--*    which decides which value to assign to Current_Cursor based
--*    upon a sort parameter and which selection criteria instance
--*    attributes may have been filled in so far.
--*
--*    There are a lot of variations on the previous two themes. The
--*    key is that you must decide how you want to set your search
--*    criteria and Current_Cursor. It is certainly acceptable to
--*    combine these different approaches in any way desired within
--*    the same stream. Just make sure and document your interfaces
--*    clearly and completely.
--*
--* 4. If you want a modifiable stream, you must export those features
--*    from XALNKLST as desired. However, if you change Max_List_Size
--*    and the stream is forced to discard portions off the front of
--*    the list, any modifications in the list which are not already
--*    physically reflected in the data base will be lost.
--*
```

```
--* How a client uses a stream:
--*
--* Assume we are in a method where My_Stream is declared of type
--* Some_Arbitrary_Stream_Class. The following piece of code shows how
--* a client of a stream class would use My_Stream.
--*
--*    . . .
--*   My_Stream.Create;
--*   My_Stream.Assign_Selection_Criteria ( , , , , );
--*   My_Stream.Move_to_Last;
--*    . . .
--*
--* Assign_Selection_Criteria would accept particular selection criteria as
--* well as assign Current_Cursor to be the correct cursor value.
--*
--* note: SQL introduces a serious drawback: it is not recursive, that
--* is, a cursor can only be open once at any one time. This means that
--* if two instances of the same stream which use the same cursor exist at
--* the same time, each stream instance will be competing for the same
--* cursor. Each instance will be closing the other instance's cursor and
--* re-opening the cursor with its own selection criteria. Serious
--* thrashing can result. One way to prevent this is to only allow one
--* instance-cursor to exist at any one time. Additionally, this effect can
--* be minimized by assigning a sufficiently large value to Number_to_Read.
--* Another, more sophisticated and more drastic approach is to declare the
--* exact same cursor multiple times with different names. Then, define
--* boolean class attributes which indicate which cursors are in use by any
--* instance of that stream class.
--*
--* note: SQLCODE is a #define macro which is translated to SQLCA.SQLCODE by
--* the SQL pre-compiler.

-- INHERIT
--    Link_List_Cls;
-- RENAME
--    Create_Stream renames Create,
--    XALNKLST_Del_All renames Delete_All,
--    XALNKLST_Del_Cur renames Delete_Current,
--    XALNKLST_Del_First renames Delete_First,
--    XALNKLST_Del_Last renames Delete_Last,
--    XALNKLST_Mov2Frst renames Move_to_First,
--    XALNKLST_Mov2Last renames Move_to_Last,
--    XALNKLST_Mov2Next renames Move_to_Next,
--    XALNKLST_Mov2Prev renames Move_to_Prev,
--    XALNKLST_Nb_Elems renames Nb_Elements;

-- EXPORT
--    Create_Stream,               --* inherited from XALNKLST
--    Current_Value,               --* inherited from XALNKLST
--    Move_to_First,               --* defined below
--    Move_to_Last,                --* defined below
--    Move_to_Next,                --* defined below
--    Move_to_Prev,                --* defined below
--    Nb_Elements,                 --* defined below
--    Restart,                     --* defined below
--    Row_Count;                   --* defined below

-- CLASS ATTRIBUTES
```

```
UNKNOWN_SQL_ERROR : EXCEPTION;
    --* a SQL error was encountered which is not one of those shown below
    --* as "SQL_?????" class attributes.

Cursor_Closed : SHORT := 0;
    --* used by Cursor_Status to indicate that the cursor is closed.
    --* this value must be zero (0), since Cursor_Status is initialized
    --* to zero (0).

Cursor_Open : SHORT := 1;
    --* used by Cursor_Status to indicate that the cursor is open.

End_of_Cursor : SHORT := 2;
    --* used by Cursor_Status to indicate that the cursor is open but at
    --* end of file condition.

SQL_OK : SHORT := 0;
    --* the previous SQL command completed successfully and normally.

SQL_Cursor_Not_Open : SHORT := -501;
    --* a fetch (or close) was attempted on a cursor which is not open.
    --* a cursor must be open before a fetch can be done.  recover by
    --* opening the cursor and trying the fetch again.

SQL_Cursor_Open : SHORT := -502;
    --* an open cursor was issued to a cursor which is already open.
    --* recover by closing the cursor and trying the open again.

SQL_End_of_Cursor : SHORT := 100;
    --* the last row in the cursor has already been read.  there are no more
    --* rows in the cursor.

Unknown_Nb_Elems : LONG := 999999999;
    --* used to initialize Nb_Elements.

-- INSTANCE ATTRIBUTES

Current_Cursor : SHORT := 0;
        --* to determine which particular cursor is in use by this instance.
        --* allows the SQL routines (i.e. SQL_Fetch, SQL_Open, & SQL_Close)
        --* to perform their tasks.
        --* note:  be very careful about changing this
        --* value after the stream has begun processing the cursor.  if you must
        --* change it, do it as follows:
        --*    SELF.Restart;
        --*    --* immediately followed by:
        --*    Current_Cursor := new_value;

Cursor_Status : SHORT := 0;
        --* saves the state of the cursor.  values correspond to Cursor_Open,
        --* Cursor_Closed, End_of_Cursor.

First_Time : BOOLEAN := TRUE;
        --* used to determine if this is the first time through the Move_to_First
        --* routine so that a Load_Next and Move_to_First can be done.

Last_Object_Fetched : Object_ID;
        --* this attribute keeps track of the last row fetched from
        --* the cursor.  it is used in conjunction with Row_Count
```

```
            --* to re-position the cursor after a DB2 commit.

Max_List_Size : LONG := LONG'MAX;
            --* this specifies the maximum number of elements to keep in the linked
            --* list at any one time.  it is used in reducing the overall memory
            --* requirements of a stream.  it is used this way:  if the number of
            --* elements in the list is equal to Max_List_Size and an additional
            --* element is to be added to the end of the list, then a Delete_First
            --* is done by the Move_to_Next method.  if you decide to reduce it from
            --* LONG'MAX, then the new value should be a multiple
            --* of Number_to_Read.  preferably a multiple greater than 1 and more
            --* like 10 or 100 times Number_to_Read.

Nb_Elements : LONG := 0;
            --* this contains the number of elements in the linked list.
            --* it is initialized as an arbitrarily large value (Unknown_Nb_Elems)
            --* when the cursor is open and retains that value until the end of the
            --* cursor is reached.  then, it is set to the actual number of elements
            --* in the list.
            --* note:  do not use this attribute in a FOR loop.  the FOR loop makes
            --* a temporary copy of the stop value and works with that instead of
            --* interrogating the original stop value each loop.  if you must use this
            --* attribute in a loop, use some sort of WHILE loop.

Number_to_Read : SHORT := 100;
            --* this is the number of rows to read from the cursor
            --* at one time.  its primary purpose is to improve
            --* performance.

Row_Count : LONG := 0;
            --* this attribute keeps track of the the number of rows fetched from
            --* the cursor.  it is used in conjunction with Last_Object_Fetched
            --* to re-position the cursor after a DB2 commit or to determine
            --* how many rows to read to rebuild the beginning of the list.

--* note to children:  declare the search criteria for ALL your cursors
        --* as instance attributes here.

-- CLASS METHODS

-- INSTANCE METHODS procedure close
          <* (* close the cursor *) *> is
            SQLCode : SHORT;
                --* used as a return parameter from the sql methods to determine
                --* if the method was successful
            begin
              -- LOGIC
              SELF.Notify;
              <* (* if the cursor is not closed, we close it.  if it is closed,
                    then we just ignore this call *) *> is
                begin
                  if
                    (Cursor_Status /= Cursor_Closed)
                  then
                    <* (* switch to the correct plan *) *> is
                    begin
                      CLASS_REF(BADBDBAS).Switch_Plan ( SELF );
```

```
              end;
            <* (* close the correct cursor *) *> is
              begin
                SELF.SQL_Close ( (&SQLCode) );
              end;
            <* (* check the sqlcode value for any errors.  it is ok if
                  the cursor was already closed when we tried to close
                  it *) *> is
              begin
                if
                  ( (SQLCode = SQL_OK)
                    or
                    (SQLCode = SQL_Cursor_Not_Open) )
                then
                  Last_Object_Fetched.FORGET;
                  Cursor_Status := Cursor_Closed;
                else
                  CLASS_REF(BADBDBAS).Set_Last_SQL_Error ( SQLCode );
                  raise UNKNOWN_SQL_ERROR;
                end if;
              end;
          end if;
        end;
    end close;

procedure delete_all
  <* (* delete all the elements in the linked list *) *> is
    --* note:  this method is provided in case a child decides
    --* to export the delete_all feature.  there are some special handling
    --* considerations which need to be implemented.
    begin
      -- LOGIC
      SELF.Notify;
      while
          (XALNKLST_Nb_Elems > 0)
        loop
          SELF.Delete_First;
        end loop;
    end delete_all;

procedure delete_current
  <* (* delete the current value (i.e. stream element) from the linked
        list *) *> is
    --* note:  this method is provided in case a child decides
    --* to export the delete_current feature.  there are some special handling
    --* considerations which need to be implemented.
    Save_Current_Value : Elem;
      --* used to save the OREF of the stream element so that it may be
      --* physically removed from memory
    begin
      -- LOGIC
      SELF.Notify;
      <* (* save the OREF to the current stream element so we can clobber it
            after we remove it from the linked list *) *> is
        begin
          Save_Current_Value := SELF.Current_Value;
        end;
      <* (* let the inherited delete current remove the node from the list *) *> is
        begin
```

```
          SELF.XALNKLST_Del_Cur;
        end;
      <* (* now, remove the stream element from memory. *) *> is
        begin
          CLASS_REF(BAOUWM).UOW_Remove_Object ( Save_Current_Value );
        end;
    end delete_current;

procedure delete_first
  <* (* delete the first element in the linked list *) *> is
    --* note:  this method is provided in case a child decides
    --* to export the delete_first feature.  there are some special handling
    --* considerations which need to be implemented.
    Save_Current_Value : Elem;
      --* used to save the OREF of the stream element so that it may be
      --* physically removed from memory
    begin
      -- LOGIC
      SELF.Notify;
      <* (* save the OREF to the current stream element so we can clobber it
            after we remove it from the linked list *) *> is
        begin
          Save_Current_Value := SELF.Current_Value;
        end;
      <* (* let the inherited delete first remove the node from the list *) *> is
        begin
          SELF.XALNKLST_Del_First;
        end;
      <* (* now, remove the stream element from memory. *) *> is
        begin
          CLASS_REF(BAOUWM).UOW_Remove_Object ( Save_Current_Value );
        end;
    end delete_first;

procedure delete_last
  <* (* delete the last element in the linked list *) *> is
    --* note:  this method is provided in case a child decides
    --* to export the delete_last feature.  there are some special handling
    --* considerations which need to be implemented.
    Save_Current_Value : Elem;
      --* used to save the OREF of the stream element so that it may be
      --* physically removed from memory
    begin
      -- LOGIC
      SELF.Notify;
      <* (* save the OREF to the current stream element so we can clobber it
            after we remove it from the linked list *) *> is
        begin
          Save_Current_Value := SELF.Current_Value;
        end;
      <* (* let the inherited delete last remove the node from the list *) *> is
        begin
          SELF.XALNKLST_Del_Last;
        end;
      <* (* now, remove the stream element from memory. *) *> is
        begin
          CLASS_REF(BAOUWM).UOW_Remove_Object ( Save_Current_Value );
        end;
    end delete_last;
```

```
procedure fetch_row (
  Stream_Element_Out : out Stream_Element )
  <* (* switch to the correct plan. execute the SQL fetch statement and
        return a stream element. if the cursor does not return a row
        (i.e. SQL code of 100), it means that we have hit end of file.
        so, invoke SELF.Close. if the cursor is not open
        (i.e. SQL code of -501), this means that the cursor was closed
        because of a commit or rollback and we must re-open the cursor
        and then try the fetch again. *) *> is
    SQL_Code : SHORT;
      --* used as a return parameter from the sql methods to determine
      --* if the method was successful
    begin
      -- LOGIC
      SELF.Notify;
      <* (* if this is the first time through, we need to force the
            cursor open *) *> is
        begin
          if
            (First_Time = TRUE)
          then
            SELF.Open;
              --* note:  SELF.Open does a data_base.switch_plan, so
              --* one is not necessary here.
            First_Time := FALSE;
          else
            <* (* switch to the correct plan *) *> is
              begin
                CLASS_REF(BADBDBAS).Switch_Plan ( SELF );
              end;
          end if;
        end;
      <* (* fetch the next row from the correct cursor *) *> is
        begin
          SELF.SQL_Fetch ( Stream_Element_Out, (&SQL_Code) );
        end;
      <* (* process the sqlcode *) *> is
        begin
          if
            (SQL_Code = SQL_OK)
          then
            <* (* we got another row, so increment the row counter *) *> is
              begin
                Row_Count := Row_Count + 1;
              end;
            <* (* keep track of the object id in the last row fetched so
                  we can reposition our cursor later if necessary *) *> is
              begin
                Last_Object_Fetched := GET_OBJECT_ID ( (*Stream_Element_Out).Object );
              end;
          else
            if
              (SQL_Code = SQL_End_of_Cursor)
            then
              Cursor_Status := End_of_Cursor;
              (*Stream_Element_Out).FORGET;
            else
              if
```

```
              (SQL_Code = SQL_Cursor_Not_Open)
            then
              SELF.Reopen;
                --* note:  the Reopen method in turn calls this method
                --* as it attempts to reposition the cursor.
                --* it is not possible that
                --* this recursive call will also get a SQL_Cursor_Not_Open
                --* condition since the cursor cannot be closed by an
                --* intermediate
                --* commit to the data base. therefore, this routine is
                --* protected from an "infinite loop" possibility.
              SELF.Fetch_Row ( Stream_Element_Out );
            else
              CLASS_REF(BADBDBAS).Set_Last_SQL_Error ( SQL_Code );
              raise UNKNOWN_SQL_ERROR;
            end if;
          end if;
        end if;
      end;
  end fetch_row;

procedure load_next
  <* (* load the next Number_to_Read Stream_Elements into the list *) *> is
    Indx : SHORT;
      --* used to drive the loop which fills up the list with Number_to_Read
      --* elements
    Stream_Element : Stream_Element;
      --* this stream element is returned by the fetch_row routine after
      --* which it is appended to the end of the linked list
    begin
      -- LOGIC
      SELF.Notify;
      <* (* initialize variables *) *> is
        begin
          Indx := 0;
        end;
      <* (* append stream elements to the end of the list. *) *> is
        begin
          while
              ( (Indx < Number_to_Read)
              and
              (Cursor_Status /= End_of_Cursor) )
            --* stop when Number_to_Read elements are loaded or when the end of
            --* the cursor is reached, whichever occurs first.  note that when
            --* the end of the cursor is reached, the fetch will return a
            --* void stream_element object reference.
          loop
            <* (* fetch the next stream element from the cursor.  if a void
                  object reference is returned, it means that we have reached
                  the end of the cursor. *) *> is
              begin
                SELF.Fetch_Row ( (&Stream_Element) );
              end;
            <* (* if stream element is not void, then we successfully
                  created a new stream element, so append it to the list *) *> is
              begin
                if
                  (Stream_Element.VOID = FALSE)
                then
```

```
                      <* (* do we need to discard an element from
                            the front of the list? *) *> is
                        begin
                          if
                            (Max_List_Size = XALNKLST_Nb_Elems)
                          then
                            SELF.Delete_First;
                          end if;
                        end;
                      <* (* add the stream element from the fetch to the
                            end of the list. *) *> is
                        begin
                          SELF.Insert_Last ( Stream_Element );
                        end;
                      <* (* increment the loop limiter *) *> is
                        begin
                          Indx := Indx + 1;
                        end;
                    end if;
                  end;
              end loop;
          end;
      <* (* update Nb_Elements if we have reached the end of the cursor *) *> is
        begin
          if
            (Cursor_Status = End_of_Cursor)
          then
            Nb_Elements := Row_Count;
              --* you won't have to look at all those 9's after this
            <* (* we hit the end of the cursor, so let's close it and
                  release database resources *) *> is
              begin
                SELF.Close;
              end;
          end if;
        end;
    end load_next;

procedure load_prev
  <* (* load the previous Stream_Elements into the list *) *> is
    Stop_Loop : LONG;
      --* Maximum_List_Size / Number_to_Read
      --* how many times to execute load_next
    begin
      -- PRECONDITION (Row_Count > Max_List_Size);
        --* note: this method is only called by the move_to_prev
        --* method, which verifies that row count is greater than
        --* the maximum list size.
      -- LOGIC
      SELF.Notify;
      <* (* set the row count to reflect the row number of the first
            element in the number_to_read block immediately before this
            current block.
            it currently reflects the row number of
            the last element in the entire list *) *> is
        begin
          Row_Count := ((Row_Count - XALNKLST_Nb_Elems) - Max_List_Size);
          <* (* make sure that Row_Count is greater than or equal to 0 *) *> is
            begin
```

```
              if
                (Row_Count < (long)0)
              then
                Row_Count := (long)0;
              end;
            end;
        end;
      <* (* let's clean everything up so we can force a reopen *) *> is
        begin
          <* (* close the cursor to release all the database resources *) *> is
            begin
              SELF.Close;
            end;
          <* (* now, clear out the list *) *> is
            begin
              SELF.Delete_All;
            end;
        end;
      <* (* here's what we've all been waiting for folks:  re-read
            the cursor up to and including the row immediately preceeding
            the first row in the old linked list *) *> is
        begin
          Stop_Loop := Max_List_Size / Number_to_Read;
          loop
            SELF.Load_Next;
            Stop_Loop := Stop_Loop - 1;
            exit when (Stop_Loop = 0);
          end loop;
        end;
    end load_prev;

procedure move_to_first
  <* (* move to the first element in the list  *) *> is
    begin
      -- LOGIC
      <* (* if we dropped something off the front of the list, we will
            need to start the cursor all over again *) *> is
        begin
          if
            (Max_List_Size < Row_Count)
          then
            SELF.Restart;
          end if;
        end;
      if
        (First_Time = TRUE)
      then
        <* (* get the first batch of elements and load them into the list *) *> is
          begin
            SELF.Load_Next;
          end;
      end if;
      <* (* position the current pointer to the first element in the list *) *> is
        begin
          if
            (XALNKLST_Nb_Elems > 0)
          then
            SELF.XALNKLST_Mov2Frst;
          end if;
```

```
            end;
        end move_to_first;

procedure move_to_last
      <* (* move to the last element in the list *) *> is
        begin
           -- LOGIC
           if
              (First_Time = TRUE)
           then
              loop
                 SELF.Load_Next;
                 exit when (Cursor_Status = Cursor_Closed);
              end loop;
           else
              while
                    (Cursor_Status /= Cursor_Closed)
                 loop
                    SELF.Load_Next;
                 end loop;
           end if;
           SELF.XALNKLST_Mov2Last;
        end move_to_last;

procedure move_to_next (
       Last_Out : out BOOLEAN )
      <* (* move to the next link in the list *) *> is
        begin
           -- LOGIC
            if
               (First_Time = TRUE )
            then
               SELF.Move_to_First;
               if
                  (XALNKLST_Nb_Elems > 0)
               then
                  (*Last_Out) := FALSE;
               else
                  (*Last_Out) := TRUE;
               end if;
            else
               <* (* if we are at the right-most end of the list and we have not
                     already hit the end of the cursor, load more from the
                     cursor into the list *) *> is
                  begin
                     if
                        ( (SELF.On_Last = TRUE)
                          and
                          (Cursor_Status = Cursor_Open) )
                     then
                        SELF.Load_Next;
                     end if;
                  end;
               <* (* let the inherited Move_to_Next do the rest of
                     the work for us *) *> is
                  begin
                     SELF.XALNKLST_Mov2Next ( Last_Out );
                  end;
            end if;
```

```
    end move_to_next;
procedure move_to_prev (
  Last_Out : out BOOLEAN )
  <* (* move to the previous link in the list *) *> is
    New_Pos : LONG;
      --* used to re-position the current pointer after a load_prev
    begin
    -- LOGIC
      if
        (First_Time = TRUE )
      then
        (*Last_Out) := TRUE;
      else
        <* (* go to the previous element in the list.
              if we are at the left-most end of the list and we have
              had to drop any previous elements, then re-open
              and re-position the cursor to load the previous number
              to read block of elements back into the list *) *> is
          begin
            if
              (SELF.On_First = TRUE)
            then
              if
                (Row_Count > Max_List_Size)    --* dropped some off front
              then
                New_Pos := Row_Count - Max_List_Size;
                if
                  (New_Pos > Max_List_Size)
                then
                  New_Pos := Max_List_Size;
                end if;
                SELF.Load_Prev;
                SELF.Move_To ( New_Pos );
                (*Last_Out) := FALSE;
              else
                (*Last_Out) := TRUE;
              end if;
            else
              SELF.XALNKLST_Mov2Prev ( Last_Out );
            end if;
          end;
      end if;
    end move_to_prev;
procedure open
  <* (* open the SQL cursor *) *> is
    SQLCode : SHORT;
    begin
      -- LOGIC
      SELF.Notify;
      <* (* switch to the correct plan *) *> is
      begin
        CLASS_REF(DADBDBAS).Switch_Plan ( SELF );
      end;
      <* (* open the correct cursor *) *> is
        begin
          SELF.SQL_Open ( (&SQLCode) );
        end;
```

```
        if
          (SQLCode = SQL_OK)
        then
          Row_Count := 0;
          Last_Object_Fetched.FORGET;
          Cursor_Status := Cursor_Open;
          Nb_Elements := Unknown_Nb_Elems;
        else
          if
            (SQLCode = SQL_Cursor_Open)
          then
            SELF.Close;
            SELF.Open;
              --* note: it is not possible that
              --* this recursive call will also get a SQL_Cursor_Open
              --* since we just closed the cursor in the previous statement.
              --* therefore, this routine is
              --* protected from an "infinite loop" possibility.
          else
            CLASS_REF(DAOBDBAS).Set_Last_SQL_Error ( SQLCode );
            raise UNKNOWN_SQL_ERROR;
          end if;
        end if;
      end open;

procedure reopen
    <* (* call Open with the initial search criteria, then fetch rows from the
          cursor Row_Count times, or the last object id fetched is located, or
          EOF, whichever occurs first and discard the fetched rows.  in some
          rare cases, it may be possible to save a "restart key".  in these
          situations, the user should redefine this method to just open the
          cursor with the restart search criteria.  the more general "loop"
          approach is shown here. *) *> is
      Dummy_Stream_Element : Stream_Element;
      Save_Last_Object_Fetched : Object_ID;
        --* to keep track of the current value of Last_Object_Fetched.
      Save_Nb_Elements : LONG;
        --* to keep track of the current value of Row_Count.
      Save_Row_Count : LONG;
        --* to keep track of the current value of Row_Count.
      begin
        -- LOGIC
        SELF.Notify;
        <* (* save the current counts *) *> is
          begin
            Save_Nb_Elements := Nb_Elements;
            Save_Row_Count := Row_Count;
          end;
        <* (* save the object id of the last object fetched so we know when
              to stop *) *> is
          begin
            Save_Last_Object_Fetched := Last_Object_Fetched;
          end;
        <* (* open the cursor.  this will put us at the beginning. *) *> is
          begin
            SELF.Open;
          end;
        <* (* since we are at the beginning of the cursor, we must discard
              all those rows which are before where we need to restart.  rows
```

```
                    are discarded until either the last_object_fetched is found,
                    or until we meet the row_count, or until the end of the cursor
                    is reached, whichever occurs first. *) *> is
              begin
                --* note:  there are some potential problems with this approach.
                --* namely, if a row has been inserted which appears in this new
                --* cursor before the last object fetched, then it is possible to
                --* get a few rows repeated.  the only way to prevent this is to
                --* create a cursor which has a restartable unique key.  see the
                --* sample code following this method which demonstrates how to
                --* write a Reopen using a restartable unique key.
                if
                  (Row_Count < Save_Row_Count)
                then
                  loop
                    SELF.Fetch_Row ( (&Dummy_Stream_Element) );
                       --* note:  the Reopen method was initially invoked by the
                       --* Fetch_Row method to reposition the cursor.
                       --* it is not possible that
                       --* this recursive call will also get a SQL_Cursor_Not_Open
                       --* condition since the cursor cannot be closed by an intermediate
                       --* commit to the data base.  therefore, this routine is
                       --* protected from an "infinite loop" possibility.
                    if
                      (Dummy_Stream_Element.VOID = TRUE)
                    then
                      break;
                    end if;
                    <* (* discard this Stream Element *) *> is
                      begin
                        CLASS_REF(BAOUWH).UOW_Remove_Object
                           ( Dummy_Stream_Element );
                      end;
                    if
                      ( (Row_Count = Save_Row_Count)
                        or
                        ( OBJID_CMP
                            ( Save_Last_Object_Fetched,
                              Last_Object_Fetched ) = FALSE ) )
                    then
                      break;
                    end if;
                  end loop;
                end if;
              end;
            <* (* restore Nb_Elements *) *> is
              begin
                "*_Elements := Save_Nb_Elements;
              end;
          end reopen;

--* example reopen using a unique key:

--* procedure reopen
--*    <* (* call Open with the current search criteria *) *> is
--*    begin
--*       -- LOGIC
--*       SELF.Open;
--*    end reopen;
```

```
   procedure restart
     <* (* close the cursor, delete all the linked list elements and
           set up for a restart at the beginning *) *> is
     begin
       -- LOGIC
       SELF.Notify;
       SELF.Close;
       SELF.Delete_All;
       First_Time := TRUE;
       Row_Count := (long)0;
       Nb_Elements := (long)0;
     end restart;

procedure sql_open (
     SQL_Code_Out : out SHORT );
     -- DEFERRED

--* sample sql_open method follows:
--*
--* <* (* declare and open the appropriate cursor *) *> is
--*
--*    --* declare all your search criteria host variables for the cursor
--*    --* declarations here.
--*    --* note: these must be in DB2 data format.  this means that you
--*    --* cannot declare a host variable of type NLS_String or NLS_Date, nor
--*    --* can you use any of our huge selection of specialized macros.  they
--*    --* must be declared using C primitive data types.  these host variables
--*    --* must begin and end with the SQL declare section statements.
--*
--*    EXEC SQL BEGIN DECLARE SECTION;
--*    some_c_type    HOST_VARIABLE_1;
--*    ...            ...
--*    some_c_type    HOST_VARIABLE_N;
--*    EXEC SQL END DECLARE SECTION;
--*
--*    --* declare your cursor here.  it must have a unique name within this
--*    --* source file.
--*
--*    EXEC SQL
--*      DECLARE
--*        CURSOR_NAME_1
--*      CURSOR FOR
--*        SELECT
--*          OBJECT_ID
--*        FROM
--*          "some table name"
--*        WHERE
--*          "some search criteria"
--*          --* note: the host variables defined above are used here
--*        ORDER BY
--*          "sort order of output";
--*
--*    the declare cursor statement is not executed.  it is simply used by
--*    the SQL pre-compiler to generate the cursor and select statement control
--*    blocks.  the cursor declaration must appear before any SQL references to
--*    the cursor.
--*
--*    begin
```

```
--*       <* (* load the local host variables from the selection criteria
--*            instance attributes *) *>;
--*       if
--*         (Current_Cursor = 1) --* better to use a name instead of a number here
--*       then
--*         EXEC SQL OPEN CURSOR_NAME_1;
--*       elseif
--*         (Current_Cursor = 2)
--*       then
--*         EXEC SQL OPEN CURSOR_NAME_2;
--*       elseif
--*         <* (* and so on, for each cursor you define . . . *) *>;
--*       end if;
--*       (*SQL_Code_Out) := SQLCODE;
--*     end sql_open;

procedure sql_close (
     SQL_Code_Out : out SHORT );
     -- DEFERRED

--* sample sql_close method follows:
--*
--*   <* (* close the SQL cursor *) *> is
--*     begin
--*       -- LOGIC
--*       if
--*         (Current_Cursor = 1) --* better to use a name instead of a number here
--*       then
--*         EXEC SQL CLOSE CURSOR_NAME_1;
--*       elseif
--*         (Current_Cursor = 2)
--*       then
--*         EXEC SQL CLOSE CURSOR_NAME_2;
--*       elseif
--*         <* (* and so on, for each cursor you define . . . *) *>;
--*       end if;
--*       (*SQL_Code_Out) := SQLCODE;
--*     end sql_close;

procedure sql_fetch (
     Stream_Element_Out : out Stream_Element;
     SQL_Code_Out : out SHORT );
     -- DEFERRED --* sample sql_fetch method follows:
--*
--* This sample code is to show an implementation which uses BADBSIEL.
--* Change delcaration of My_Stream_Element to be the particular stream
--* element you will be using.
--*
--*   <* (* execute the SQL fetch statement against the appropriate cursor
--*           and fill in the Stream_Element *) *> is
--*
--*     --* declare all local variables here to be used with the SQL fetch.
--*     --* note:  these must be in DB2 data format.  this means that you
--*     --* cannot declare a host variable of type NLS_String or NLS_Date, nor
--*     --* can you use any of our huge selection of specialized macros.  they
--*     --* must be declared using C primitive data types.  these host variables
--*     --* must begin and end with the SQL declare section statements.
```

```
--*        My_Stream_Element : Stream_Element;
--*        EXEC SQL BEGIN DECLARE SECTION;
--*        unsigned char    OBJECT_ID[29];
--*        EXEC SQL END DECLARE SECTION;
--*        begin
--*          -- LOGIC
--*          My_Stream_Element.FORGET;
--*          if
--*            (Current_Cursor = 1) --* better to use a name instead of a number here
--*          then
--*            EXEC SQL
--*              FETCH
--*                 CURSOR_NAME_1
--*                INTO
--*                  :OBJECT_ID;
--*            --* don't worry about spurious SQLCodes.
--*            --* fetch_row will handle all SQLCodes for you.
--*          elseif
--*            (Current_Cursor = 2)
--*          then
--*            EXEC SQL
--*              FETCH
--*                 CURSOR_NAME_2
--*                INTO
--*                  :OBJECT_ID;
--*            --* don't worry about spurious SQLCodes.
--*            --* fetch_row will handle all SQLCodes for you.
--*          elseif
--*            <* (* and so on, for each cursor you define . . . *) *>;
--*          end if;
--*          (*SQL_Code_Out) := SQLCODE;
--*          if
--*            (*SQL_Code_Out = SQL_OK)
--*          then
--*            My_Stream_Element.Create ( OBJECT_ID );
--*              --* other parameters should be added to the Create method as
--*              --* additional attributes are added to the stream element you
--*              --* define.  see BADBSIEL for more information.
--*            <* (* load all host variables from the fetch into the
--*                  selection criteria instance attributes for efficient
--*                  cursor repositioning if a reopen is necessary. If your cursor
--*                  does not have a unique restart key, ignore this step. *) *>;
--*          end if;
--*          (*Stream_Element_Out) := My_Stream_Element;
--*        end sql_fetch;

end Stream_Cls;
```

```
package body STREAM_ELEMENT is                --* BADBSTEL

--* A stream object returns a fixed list of Stream_Elements.  The Stream_Element
--* contains an Object ID.  Most users will inherit this class and define
--* additional attributes.  additional attributes mean additional parameters
--* to the create and initialize methods.

-- INHERIT
--    Frame_Class;
-- RENAME
--    Frame_Create renames Create;

-- EXPORT
--    Create,
--    Object;

-- INSTANCE ATTRIBUTES

Object : Object_Class;

-- CLASS METHODS procedure create (
    Object_In : in Object_Class )
  <* (* create the new stream element object *) *> is
    begin
      -- LOGIC
      SELF.Frame_Create ( Instance );
      (*Instance).Initialize ( Object_In );
    end create;

-- INSTANCE METHODS procedure initialize (
    Object_In : in Object_Class )
  <* (* set Object to Object_In *) *> is
    begin
      -- LOGIC
      SELF.Notify;
      Object := Object_In;
    end initialize;

end STREAM_ELEMENT;
```